(12) United States Patent
Shiffman et al.

(10) Patent No.: US 12,387,216 B2
(45) Date of Patent: *Aug. 12, 2025

(54) ORCHESTRATION TECHNIQUES FOR ADAPTIVE TRANSACTION PROCESSING

(71) Applicant: Giant Oak, Inc., Arlington, VA (US)

(72) Inventors: Gary Shiffman, Arlington, VA (US); Jacob Shapiro, Arlington, VA (US)

(73) Assignee: CONSILIENT, INC., Arlington, VA (US)

( * ) Notice: Subject to any disclaimer, the term of this patent is extended or adjusted under 35 U.S.C. 154(b) by 403 days.

This patent is subject to a terminal disclaimer.

(21) Appl. No.: 17/365,807

(22) Filed: Jul. 1, 2021

(65) Prior Publication Data
US 2022/0005042 A1    Jan. 6, 2022

Related U.S. Application Data

(60) Provisional application No. 63/046,821, filed on Jul. 1, 2020.

(51) Int. Cl.
| | |
|---|---|
| *G06Q 20/40* | (2012.01) |
| *G06F 18/214* | (2023.01) |
| *G06Q 20/38* | (2012.01) |
| *G06Q 40/02* | (2023.01) |

(52) U.S. Cl.
CPC ....... *G06Q 20/4016* (2013.01); *G06F 18/214* (2023.01); *G06Q 20/3821* (2013.01); *G06Q 20/409* (2013.01); *G06Q 40/02* (2013.01)

(58) Field of Classification Search
CPC .............. G06Q 20/4016; G06Q 20/40
See application file for complete search history.

(56) References Cited

U.S. PATENT DOCUMENTS

| | | | |
|---|---|---|---|
| 11,227,288 B1 * | 1/2022 | Daines | G08B 21/182 |
| 2010/0195806 A1 | 8/2010 | Zhang et al. | |
| 2012/0130724 A1 | 5/2012 | Flegel et al. | |

(Continued)

OTHER PUBLICATIONS

International Search Report and Written Opinion in International Appln. No. PCT/US2021/040190, dated Oct. 6, 2021, 9 pages.

(Continued)

*Primary Examiner* — Azam A Ansari
(74) *Attorney, Agent, or Firm* — Fish & Richardson P.C.

(57) ABSTRACT

Systems and techniques are described for orchestrating iterative updates to machine learning models (e.g., transaction models) deployed to multiple end-user devices. In some implementations, output data generated by a first transaction model deployed at a first end-user device is obtained. The first transaction model is trained to apply a set of evidence factors to identify potentially anomalous activity associated with a first target entity. An adjustment for a second transaction model deployed at a second end-user device is determined. The second transaction model is trained to apply the set of evidence factors to identify potentially anomalous activity associated with a second target entity determined to be similar to the first target entity. A model update for the second transaction model is generated. The model update specifies a change to the second transaction model. The model update is provided for output to the second end-user device.

20 Claims, 8 Drawing Sheets

(56) References Cited

U.S. PATENT DOCUMENTS

2019/0042887 A1\* 2/2019 Nguyen .............. G06F 18/2148
2020/0104849 A1\* 4/2020 Cai ........................ G06Q 40/00

OTHER PUBLICATIONS

Extended European Search Report in European Appln. No. 21831654.5, mailed on Jan. 2, 2024, 10 pages.
International Preliminary Report on Patentability in International Appln. No. PCT/US2021/040190, mailed on Jan. 12, 2023, 8 pages.

\* cited by examiner

ORCHESTRATION TECHNIQUES FOR ADAPTIVE TRANSACTION PROCESSING

CROSS-REFERENCE TO RELATED APPLICATIONS

This application claims the benefit of U.S. Provisional Patent Application No. 63/046,821, filed Jul. 1, 2020, which is incorporated herein by reference in its entirety.

TECHNICAL FIELD

This specification generally describes technology related to machine learning, and more particularly, to technology related to transaction processing systems.

BACKGROUND

Transaction processing software is often used by regulated entities to prevent or report illicit activities to regulatory bodies. Examples of such software include transaction monitoring systems, currency transaction reporting systems, customer identity management systems, and compliance management systems.

Transaction monitoring software generally focus on identification of suspicious activity, imposed on regulated entities. Currency Transaction Reporting (CTR) generally deal with large cash transaction reporting requirements, e.g., $10,000, and over in the U.S. Customer identity management systems check various negative lists (such as the Office of Foreign Asset Control) and represent an initial and ongoing part of KYC requirements. Electronic verification can also check against other databases to provide positive confirmation of an identification.

Compliance software often helps financial institutions comply with regulatory requirements, e.g., anti-money laundering (AML) regulations. Such software can also be used to retain the necessary evidence of compliance and deliver and record appropriate training of relevant staff. In some instances, compliance software can be used to produce audit trails of compliance officers' activities in particular pertaining to the handling of alerts raised against customer activity.

SUMMARY

This disclosure describes systems and techniques for orchestrating iterative updates to machine learning models (e.g., transaction models) deployed to multiple end-user devices. In some implementations, a trained transaction model is deployed at a first end-user device and a second end-user device that are each independently managed and operated. For example, the first and second end-user devices can be servers associated with two banking institutions that provide financial services to two distinct sets of account holders. The system monitors output data generated by a first transaction model (deployed at the first end-user device) by processing transaction data associated with the first end-user device (e.g., predictions relating to potentially anomalous activity). The system evaluates the monitored data to identify possible adjustments to a second transaction model (deployed at the second end-user device). The system orchestrates the possible adjustments by providing an update to the second end-user device. The update only includes, for instance, model parameters and weights, and so that transaction data associated with the first end-user device is not inadvertently exposed to the second end-user device. In this way, the orchestration techniques employed by the system enables iterative refinement of transaction model deployments amongst different end-user devices in a secure fashion and without exchanging transaction data of multiple end-users.

As an example, the system can generate a money laundering model trained to predict a likelihood that a transaction performed by a food truck business represents a money laundering transaction. Once training is complete, the system can deploy the trained money laundering model to two banks that are each located in distinct geographic locations (e.g., a first bank located in Washington D.C., and a second bank located in San Francisco, California). In this example, the deployed money laundering models can be applied to transaction data generated by account holders of each bank to determine a likelihood that transactions represent money laundering transactions.

In the example, the system monitors predictions generated by each deployed money laundering model to identify possible refinements (e.g., adjustments to model parameters and weights) that may be applicable to existing model deployments. For instance, both banks may have account holders that are food truck businesses, and output data generated by a first money laundering model (deployed at the first bank) may indicate potential money laundering activity associated with food truck businesses are most likely to have cash transactions exceeding a $1,000 value. In this instance, the system generates a model update that increases a baseline weight assigned to a model parameter "cash transactions exceeding $1,000 value" for food truck businesses. The system then orchestrates the model update to a second money laundering model (deployed at the second bank) so that the updated model processes transaction data of account holders of the second bank using the updated parameter weight. In this way, orchestration enables performance improvement of the model deployed at the second bank based on output data generated by the model deployed at the first bank. Moreover, because the model update to the second bank only identifies a model parameter and weight, the orchestration can be implemented without exposing any transaction data of account holders of the first bank (or predictions generated for the transaction data) to the second bank.

In some implementations, the system is also capable of applying machine learning techniques to dynamically identify potentially anomalous activity of entities. The potentially anomalous activity can represent, for example, suspicious activity performed by an associated entity, a deviation from regular transactional activity, or some other type of activity that may be of interest to a regulating entity.

The system can also identify potentially anomalous activity in a manner that addresses limitations of some transaction processing systems. The system can classify entities as belonging to distinct peer groups that each share a set of attributes, such as a business classification, an average transaction value, types of reoccurring transactions, and a number of employees, among others. As an example, a peer group can include entities that are money service businesses that operate in Washington, D.C.

The system can also apply adaptive transaction processing techniques using pattern recognition to evaluate the normalcy of transaction data and thereby identify potentially anomalous activity associated with entities within a peer group. For example, potentially anomalous activity can be transactions or activity that are not considered to be normal for entities included in the same particular peer group. Because the system evaluates transaction data with respect to the shared attributes of a peer group, the identification of potentially anomalous activity is contextualized to the types of normal activity associated with the peer group. These techniques enable the system to evaluate transaction data in a more dynamic fashion so that different types of behaviors are factored into transaction data evaluation. Compared to transaction evaluation rules that apply static criteria to identify anomalous activity, the dynamic transaction processing techniques described herein allow a system to improve performance by, for example, reducing the likelihood of false positive detection and improving the likelihood of identifying activity that may otherwise appear normal given a set of static criteria.

The system can also improve the likelihood that a regulator will accurately identify transaction anomalies that require further review. To accomplish this, the system can compute a "prioritization indicator" that represents a relative assessment of anomalous activity. For example, the system can compute and assign a prioritization score to each entity belonging to a peer group so that entities that are assigned the highest score values are entities that are identified as having the greatest amount of potentially anomalous activity. In other examples, the prioritization indicator is not strictly a score, but can be a label that represents how anomalous an entity is compared to the other entities of the same peer group, e.g., "HIGH," "MEDIUM," or "LOW" labels.

Additionally, the architecture of the system provides various technological improvements to techniques used by transaction processing computing systems to compute transaction metrics. The techniques described herein enable the system to compute transaction metrics with greater precision and have greater utility to an end-user compared to transaction metrics computed using static transaction processing rules. For example, the system can apply trained transaction models to identify data patterns within transaction data and reduce the amount of transaction information that is output to end-users. This ensures that only the most relevant transaction information, i.e., transaction information that is most likely to represent potentially anomalous activity, is provided to end-users, thereby improving the transaction processing workflows used by end-users. For instance, the system can use a peer grouping model to classify entities within certain peer groups based on attributes shared between the entities of the same peer group. When processing transaction data for a certain entity to identify potentially anomalous activity, the system can use the peer group classification to select only the transaction models that are relevant to the attributes associated with the peer group and avoid processing the transaction data using transaction models that are not relevant. This selective transaction modeling technique can be used to reduce the amount of information that is provided for output to an end-user.

As an example, a restaurant can be assigned to a food services peer group that includes other restaurants in a geographic region. In processing the transaction data for the restaurant, the system can apply a money laundering transaction model that is trained to identify potentially anomalous activity at restaurants that are likely to represent money laundering activity. In this example, the system can use the peer group classification to select only relevant transaction models and not those transaction models that are unlikely to yield useful data metrics. For instance, if the restaurant's transactions are usually below a threshold value required to generate a suspicious activity report (SAR), e.g., $10,000, then processing the restaurant's transaction data with a transaction model that evaluates compliance with SAR regulations is not likely to produce useful data metrics since most of the restaurant's transactions fall outside the scope of SAR regulations. In this example, the system therefore utilizes peer group classification to select only the most relevant transaction models that are expected to provide useful data metrics, and thereby process transaction data using a directed technique that produces more precise transaction metrics. This technique identifies potentially anomalous activity with sufficient accuracy and/or improves the process associated with identifying potentially anomalous activity.

Moreover, the adaptive transaction processing techniques described herein enable a computing system to automate transaction processing in a way that provides improvements to manual transaction processing that can be performed by an end-user. For example, manual identification of potentially anomalous activity introduces significant latencies in transaction processing due to the large volume of transaction data that is typically required to be processed to make sufficiently accurate identifications. Manual identifications can be rendered obsolete if performed by a human (or a group of humans) due to amount of time required to track transaction information, during which entity activity may have changed to reflect different patterns. Manual transaction processing techniques therefore often fail to represent the most recent activity patterns since they rely on lagging activity indicators. In contrast, the automated transaction processing techniques described herein can increase processing throughput, which enables a computing system to process and evaluate transaction activity as entity performs them or within a short time period after the transaction activity is electronically recorded, e.g., a day after a bank account records a performed transaction. This allows the system to more dynamically evaluate transaction activity patterns in a manner that is not achievable using analogous manual transaction processing techniques.

Due to the large volume of transaction data that is often accumulated for entities, manually comparing individual transactions to historical transactional activity can be laborious and significantly reduces transaction analysis throughput compared to analogous automated techniques. Due to the time constraints in an end-user's ability to review and evaluate transaction data, manually processing often makes transaction evaluation unreasonable and unproductive. Manual comparisons of transaction data may also be susceptible to human error and can therefore reduce the overall accuracy of transaction evaluation.

The dynamic transaction processing techniques disclosed herein also enable the system to adapt transaction processing as activities of entities change over time. The system can dynamically adjust the normalcy standard for a peer group to coincide with changes in transaction activity patterns of entities over time. For instance, the system can adjust peer group classifications and/or attributes associated with peer group classifications to represent changes in entity activity. As an example, if an entity has recently moved its headquarters to a new location, then the peer group assigned to the entity can be adjusted so that the entity is assigned to a new peer group that includes entities operating in the new location. The system can also use learning techniques to identify changes in transaction activity patterns to readjust the constituency of peer groups, adjust attributes that define a peer group, or re-training transaction models used to identify potentially anomalous activity. The system therefore addresses an inherent limitation using static transaction processing techniques to evaluate anomalousness in changing transaction activity, which is often unachievable using analogous manual evaluation techniques that rely on static transaction evaluation criteria. In this manner, the system can adjust prediction parameters to improve anomalous activity identification over time, which is often more difficult to accomplish using manual transaction processing techniques.

The use of trained transaction models also provides various advantages over many conventional transaction reporting systems that evaluate transaction data based on static rules specifying triggers and/or fixed conditions to identify potentially anomalous activity. For example, the system applies peer group classifications for an entity to aggregate and evaluate transaction data in the context of other entities that are likely to perform similar transactions, thereby providing for accurate representation of normalized transactions. By evaluating transaction data for an entity relative to other entities within the peer group, the system is therefore capable of identifying at least two types of anomalies given a set of historical transaction data.

First, the system can identify transactions that are anomalous based on historical transaction activity of a given entity. For example, if historical transaction data indicates that the average transaction value of transactions for an entity is $500, then a transaction with a value of $5,000 can be identified as a potentially anomalous transaction relative to other verified transactions associated with the entity. Second, the system can identify potential anomalous transactions with respect to normalized transactions associated with other entities that are classified as belonging to the same peer group as a particular entity. For example, if historical transaction data for all entities assigned to the peer group indicates that the average transaction value of transactions is $1,000, then a transaction with a transaction value of $10,000 can be identified as a potentially anomalous transaction (irrespective of whether the transaction value resembles the transaction values of other prior transactions of the entity).

Moreover, the system can use the dynamic transaction processing techniques to improve the likelihood of identifying elusive transaction activity that may be undetectable using a static rule-based monitoring approach. For example, the system can use peer group classification technique to evaluate the transaction activity of a cleaning service provider relative to the transaction activity of other similar cleaning service providers in lieu of applying a static rule that requires only evaluation of transactions that satisfy a threshold amount, e.g., transactions with transaction values in excess of $10,000. Application of static rule may avoid the detection of, for example, suspicious transactions that do not satisfy the threshold amount but are otherwise used by the cleaning service provider for illicit purposes. However, by using the peer group classification of the cleaning service provider to compare transaction activity patterns to the transaction activity patterns of other similar cleaning service providers, the system can identify transactions (whether or not they satisfy a threshold value) that are not expected to be performed by the cleaning service provider.

In one general aspect, a computer-implemented method includes a set of operations. The operations include obtaining, by a server system, output data generated by a first transaction model deployed at a first end-user device. The first transaction model is trained to apply a set of evidence factors to identify potentially anomalous activity associated with a first target entity. The operations also include determining, by the server system, an adjustment for a second transaction model deployed at a second end-user device. The second transaction model is trained to apply the set of evidence factors to identify potentially anomalous activity associated with a second target entity determined to be similar to the first target entity. Additional operations include generating, by the server system, a model update for the second transaction model. The model update specifies a change to the second transaction model. The operations also include providing, by the server system, the model update for output to the second end-user device. The model update, when received by the second end-user device, causes the second end-user device to adjust the second transaction model according to the change specified by the model update.

One or more implementations can include the following optional features. In some implementations, the output data includes a set of model parameters for identifying the potentially anomalous activity associated with the first target entity and a respective model weight for each model parameter included in the set of model parameters.

In some implementations, the first transaction model is trained to identify the potentially anomalous activity associated with the first target entity by applying the set of evidence factors to transaction data associated with the first target entity. The output data excludes the transaction data associated the first target entity.

In some implementations, the second transaction model is trained to identify the potentially anomalous activity associated with the second target entity based on a second set of model parameters. The adjustment for the second transaction model includes removing a model parameter included in the set of model parameters associated with the first target entity and the second set of model parameters associated with the second target entity.

In some implementations, the second transaction model is trained to identify the potentially anomalous activity associated with the second target entity based on a second set of model parameters. The adjustment for the second transaction model includes adding a model parameter included in the set of model parameters associated with the first target entity and not included in the second set of model parameters associated with the second target entity.

In some implementations, the second transaction model is trained to identify the potentially anomalous activity associated with the second target entity based on a second set of model parameters. The adjustment for the second transaction model includes adjusting a model weight of a model parameter included in the set of model parameters associated with the first target entity and the second set of model parameters associated with the second target entity.

In some implementations, the output data includes a peer group of entities that share a first set of attributes with the first target entity and the second target entity. The adjustment for the second transaction model includes a change to a peer group classification for the second target entity.

In some implementations, the method further includes receiving, by the server system and from the second end-user device, an indication that the second transaction model was adjusted based on the model update. The method also includes based on receiving the indication that the second transaction model was adjusted based on the model update, providing, by the server system and to the second end-user device, an instruction, that when received by the second end-user device, causes the second end-user device to perform operations. The operations include classifying second target entity to the peer group classification that was changed based on the model update, and obtaining, from one or more data sources, transaction data for the first target entity and transaction data for entities included in the peer group classification that was changed based on the model update. Additional operations include processing, using the second transaction model, the transaction data for the second target entity in relation to the transaction data for entities included in the peer group classification that was changed based on the model update to determine a prioritization indicator for the second target entity, and enabling a user to perceive a representation of the prioritization indicator.

In some implementations, the prioritization indicator includes a score.

In some implementations, a value of the score represents a number of potentially anomalous transactions included in the transaction data for the second target entity.

In some implementations, a value of the score represents a probability that set of transactions of the second target entity are determined to be anomalous relative to entities included in the peer group that was adjusted based on the model update and to which the second target entity was classified.

In some implementations, the method further includes additional operations. The additional operations include receiving, by the server system and from the second end-user device, an indication that the second transaction model has been adjusted according to the change specified by the model update. The additional operations also include obtaining, by the server system, second output data generated by second transaction model after being adjusted according to the change specified by the model update. Further, the additional operations include determining, by the server system, an adjustment for a third transaction model deployed at a third end-user device. The third transaction model is trained to apply the set of evidence factors to identify potentially anomalous activity associated with a third target entity determined to be similar to the second target entity. The additional operations include generating, by the server system, a model update for the third transaction model. The model update for the third transaction model specifies a change to the third transaction model. Further, the additional operations include providing, by the server system, the model update for the third transaction model for output to the third end-user device. The model update, when received by the third end-user device, causes the third end-user device to adjust the third transaction model according to the change specified by the model update for the third transaction model.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
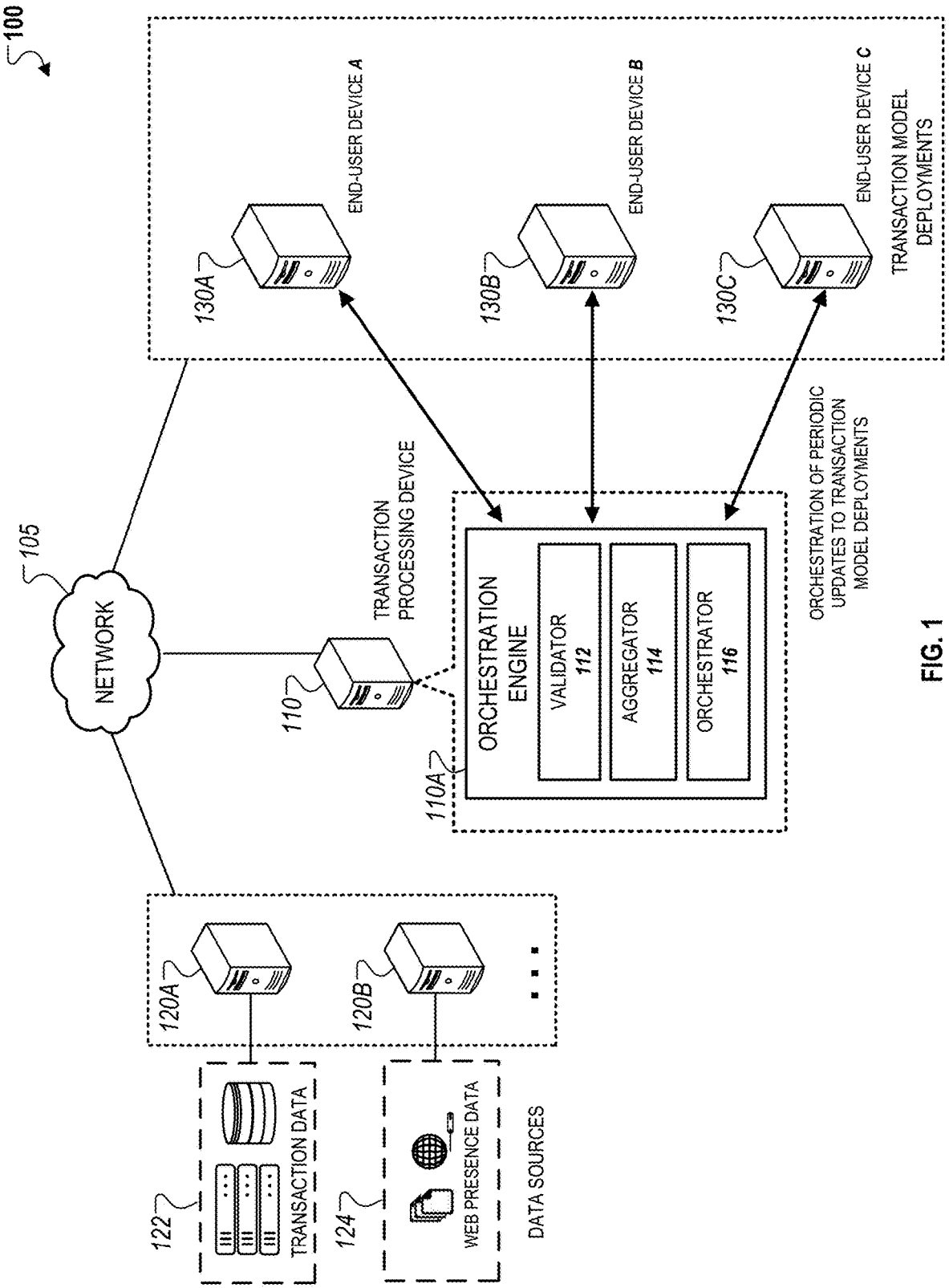
FIG. 1 is a diagram that illustrates an example of an adaptive transaction processing system capable of orchestrating updates among multiple transaction model deployments.

In general, this disclosure describes systems and techniques for orchestrating iterative updates to machine learning models (e.g., transaction models) deployed to multiple end-user devices. In some implementations, a trained transaction model is deployed at a first end-user device and a second end-user device that are each independently managed and operated. For example, the first and second end-user devices can be servers associated with two banking institutions that provide financial services to two distinct sets of account holders. The system monitors output data generated by a first transaction model (deployed at the first end-user device) by processing transaction data associated with the first end-user device.

The system evaluates the monitored data to identify possible adjustments to a second transaction model (deployed at the second end-user device). The system orchestrates the possible adjustments by providing an update to the second end-user device. The update only includes, for instance, model parameters and weights, and so that transaction data associated with the first end-user device is not inadvertently exposed to the second end-user device. In this way, the orchestration techniques employed by the system enables iterative refinement of transaction model deployments amongst different end-user devices in a secure fashion and without exchanging transaction data of multiple end-users.

As described throughout, an "entity" refers to an individual or an organization associated with transactions that are of interest to an end-user such as a regulator or investigator. For example, an entity may be a corporation performing transactions that are evaluated for potentially anomalous activity to determine whether the corporation has potentially violated any laws or regulations enforced by a prosecuting agency such as the U.S. Department of Justice. In another example, an entity may be an individual that a banking institution runs a background investigation on prior to granting a loan or providing high-value financial services to the individual. In some other examples, an entity may be an account holder with the banking institution. In such examples, the banking institution may regularly monitor accounts of account holders to determine if any potentially anomalous activity has occurred in accordance with financial regulations placed on the banking institution.

In addition, a "peer group" refers to a classification for a group of entities based on a set of shared attributes. For example, a peer group can include money service businesses that conduct currency exchange transactions in Washington D.C. In this example, the entities assigned the peer group share the attributes of business classification, i.e., money service businesses, and geographic location, i.e., Washington D.C. As described below, the number of attributes that are shared amongst constituent entities of a peer group can be varied to adjust the level of similarity for entities to be classified in a peer group. In some instances, an entity can be assigned to multiple peer groups to reflect different types of similarity amongst entities. For example, an entity that is a restaurant can be assigned to a food service peer group as well as a peer group for entities having a gross revenue exceeding a threshold value.

As described herein, "attribute" refers to an individual measurable property or characteristic of a phenomenon being observed using machine learning or pattern recognition. Attributes, as described here in, can be numeric, e.g., average transaction value, or structural, e.g., strings and graphs used for syntactic pattern recognition. For example, attributes of an entity can be used as an informative, discriminating and/or identifying features of the entity for the purposes of pattern recognition, classification, or regression. As described below, attributes of an entity can be used to classify entity as belonging to a particular peer group. For example, entities classified as belonging to the same entity can each share a set of attributes that are associated with the peer group as whole.

As described herein, a "transaction" refers to an agreement between a buyer and seller to exchange goods, services, or financial instruments. For example, a transaction can refer to a transfer of currency from a sending entity to a recipient entity. Transactions, as described herein, can include electronic transactions, e g., transactions recorded on or using a computing device, or paper transactions, e.g., transactions recorded on paper without the use of a computer.

As described herein, "anomalous" activity refers to activity that is predicted to deviate from a specified standard, normal, or expected activity. For example, a transaction of an entity is deemed likely to be "anomalous" if the transaction deviates from historical transactions of the entity or if the transaction deviates from historical transactions of other entities that are classified to the same peer group as the entity. As another example, an entity is deemed to be "anomalous" if, for instance, it is identified as having an attribute that deviates from corresponding attributes of other entities classified to the same peer group, e.g., frequency of transactions, average transaction value, number and types of transacting partners, etc.

It should be noted that the system disclosed herein identifies potentially anomalous activities, i.e., activity that is likely to be anomalous, but does not provide an end-user with conclusions as to whether transaction activity is in fact actually anomalous. Instead, the system computes prioritization indicators based on pattern recognition analysis to identify activity having attributes that deviate from known attributes of activities associated with a peer group classification. The prioritization indicators can be used by an end-user as a way to filter activity to monitor and place greater emphasis on entities that are identified as having prioritization indicators indicating highest likelihoods of anomalous activity. In this respect, the end-user forms a conclusion as to whether an entity or a transaction is actually anomalous based on prioritizations provided for output by the system.

FIG. 1 is a diagram that illustrates an example of an adaptive transaction processing system 100 capable of orchestrating updates among multiple transaction model deployments. The system 100 includes a transaction processing device 110, data sources 120A and 1206, and end-user devices 130A, 1306, and 130C. The components of the system 100 exchange data communications over a network 105. The transaction processing device 110 includes an orchestration engine 110A, which further includes a validator 112, an aggregator 114, and an orchestrator 116. The data sources 120A, 120B store or otherwise obtain transaction data 122 and web presence data 124, respectively. The end-user devices 130A-C each execute software that enables execution of trained transaction models that are deployed by the transaction processing device 110.

In general, the system 100 is capable of orchestrating updates amongst multiple distinct transaction model deployments to enable iterative development of each deployment. For example, output data generated by a model deployed at the end-user device 130A can be used to refine model parameters and weights of a model deployed at the end-user device 1308. In this way, individual model deployments can be iteratively refined through time based on contextualized prediction performance of other model deployments. This orchestration technique can be used to collectively improve the performance of the model in future deployments.

The transaction models described throughout are trained to identify potentially anomalous activity in a context-specific manner. Potentially anomalous activity can include, for example, an identification of entities that are anomalous relative other entities classified to the same peer group, or identification of transactions that are anomalous relative to historical transactions of the entity or anomalous relative to transactions of other entities classified to the same peer group.

Figure 2:
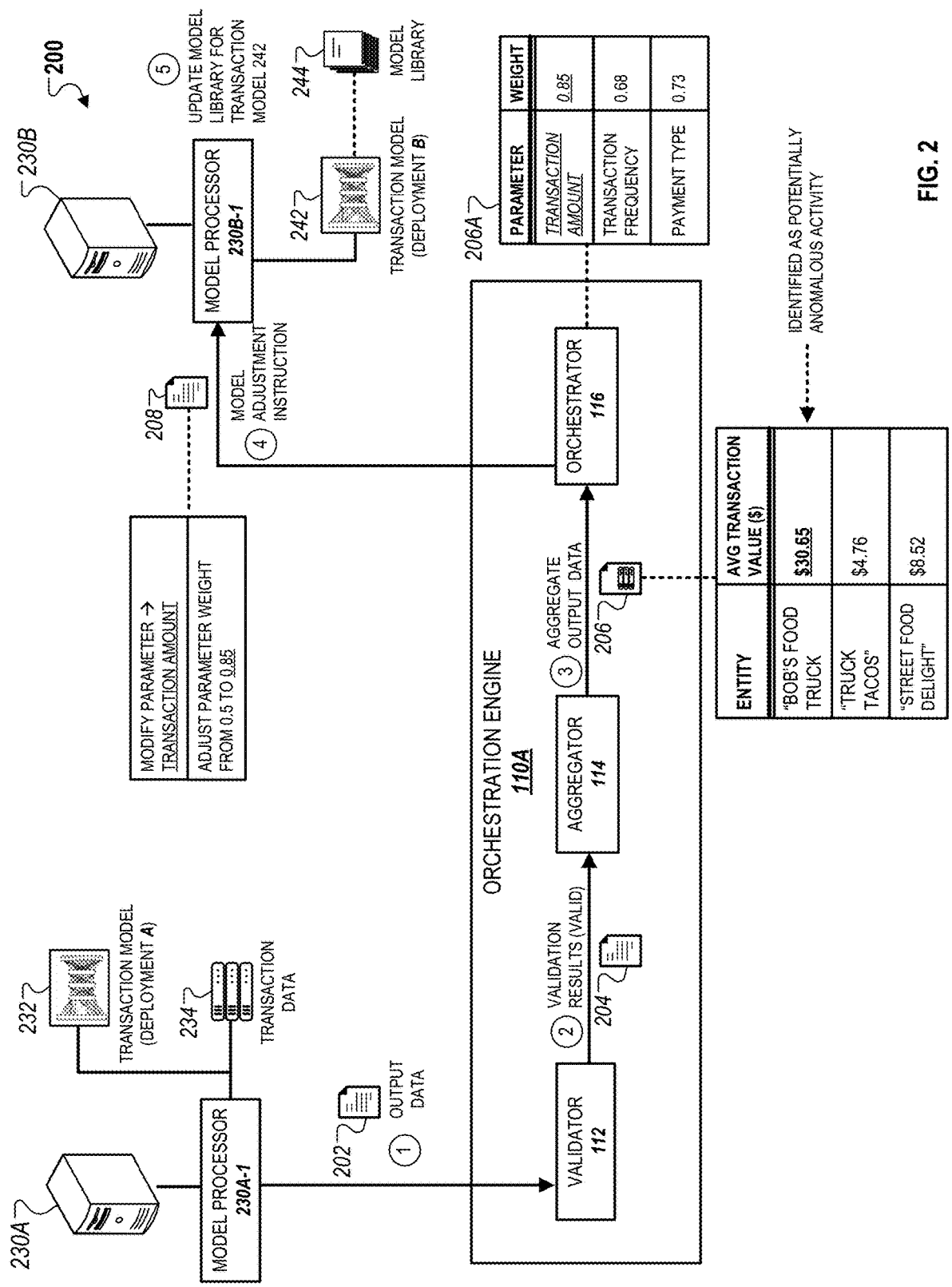
FIG. 2 is a diagram that illustrates an example of a technique for orchestrating updates between two transaction model deployments.

Referring now to the components of system 100, the transaction processing device 110 can be a server system that is capable of performing the orchestration techniques described herein. The transaction processing device 110 includes an orchestration engine 110A configured to exchange data communications with each of the end-user devices 130A-C. For example, as described throughout, once a transaction model has been deployed to each of the end-user devices 130A-C, the orchestration engine 110A can monitor output data generated at each end-user device to determine whether a model update should be generated. Once such a determination has been made, the orchestration engine 110A can transmit a model update that adjusts and/or refines existing configurations of transaction model deployments. For example, as shown in FIG. 2, the model update can add, remove or modify a model parameter (e.g., type of transaction monitored for an entity belonging to a peer group). The model update can also adjust a weight assigned to the model parameter (e.g., a weight representing a contribution of a transaction feature to an overall likelihood of determining potentially anomalous activity).

The orchestration engine 110A includes a validator 112, an aggregator 114, and orchestrator 116, each of which are configured to perform a different aspect of the orchestration techniques disclosed throughout. The validator 112 is a data processor configured to evaluate monitored output data to ensure that a model update is warranted. As one example, the orchestration engine 110A can obtain output data indicating model parameters that are identified as most frequently being associated with potentially anomalous activity. In this example, the validator 112 determines that the obtained output data indicates a valid adjustment if the same model parameters are identified in the output data generated by multiple of the end-user devices 130A-C (suggesting that similar type of transaction data exists amongst multiple transaction model deployments). As another example, the orchestration engine 110A can obtain output data indicating a model parameter that is identified as most frequently being associated with potentially anomalous activity in transaction data associated with end-user device 130A. In this example, the validator 112 can determine that that the obtained output data instead may not indicate a valid adjustment if only output data obtained from one of the transaction model deployments (i.e., end-user device 130A) specifies a certain type of pattern.

The validator 112 can also be configured to evaluate predictions generated by transaction models deployed at each of the end-user devices 130A-C. In some implementations, the validator 112 performs the evaluation relative to a set of standardized objective criteria associated with a transaction model. For example, the validator 112 can use a threshold transaction value for transactions associated with a certain type of entity such that predictions indicating transaction values greater than the threshold likely represent an invalid prediction since the statistical likelihood of such a transaction occurring is relatively low (e.g., less than 5% probability). In this example, the validator 112 can perform automated evaluations of output data generated by deployed transaction models with limited or no human interventions. For instance, output data identified as likely representing invalid predictions can be identified can provided to a user for further review or confirmation.

In some other implementations, the validator 112 can be configured to permit manual verification or validation of output data by a user. For example, an employee of an organization that manages the transaction processing device 110 can use the validator 112 to manually review output data periodically obtained by the orchestration engine 110A from the end-user devices 130A-C. In this example, the employee can review the output data to confirm, for instance, whether a proposed adjustment to model parameters and/or weights in existing model deployments would be beneficial for model performance, whether a pattern identified by a transaction model as representing potentially anomalous activity actually represents the type of activity predicted, among others. In some instances, the validator 112 can perform a coarse validation procedure using objective indicators, and the user can perform a fine-tuned validation procedure to identify possible false-positives that were not identified by the validator 112 as representing valid output data, or false-negatives that were incorrectly identified by the validator as representing valid output data.

The aggregator 114 is configured to accumulate and process output data received from multiple end-user devices, and generate aggregate data representing shared attributes amongst the multiple end-user devices. For example, the aggregator 114 can identify, from among the respective output data received from each of the end-user devices 130A-C, model parameters that identified in different model deployments. In this example, the aggregator 114 can generate aggregate data that includes the model parameters that are determined to be included in output data generated by two or more model deployments.

The orchestrator 116 can be configured to coordinate model updates that are provided to end-user deployments. For example, if a model update is scheduled to be provided to all existing model deployments, the orchestrator 116 can identify all model deployments to receive the model update, and schedule the model update to be transmitted to the identified model deployments. Once the model updates have been delivered to all existing model deployments, the orchestrator 116 can monitor update status to identify, for instance, model deployments that have implemented the model update (e.g., by executing a software update), and other model deployments that have not implemented the model update and therefore are generating output data using an outdated version of the transaction model. The orchestrator 116 can provide periodic updates to model deployments that have not implemented a model update after a specified period of time has passed since the model update was provided (e.g., one week).

In some implementations, the orchestrator 116 is configured to implement versioning techniques to generate records of previously implemented modeling updates. In such implementations, the orchestrator 116 can maintain, for instance, a table that identifies a global version for all model deployments, a current version of a model deployment, the last implemented model update, and a data of the next implemented model update. The orchestrator 116 can be configured to exchange data with individual model deployments to ensure that the current version of the model deployment matches the global version for all model deployments.

In some implementations, the orchestrator 116 can be configured to process output data obtained from multiple end-user devices to identify any similarities and/or differences that may impact model refinement using the orchestration techniques described throughout. For example, the orchestrator 116 can identify a number of peer group typologies that are shared amongst output data generated by two model deployments to determine a similarity metric between the two model deployments. In this example, the orchestration engine 110A uses the similarity metric to provide end-user devices of the two model deployments with nearly identical model updates since their deployed models are likely to be processing transaction data of entities that are classified as belonging to the same peer groups. Likewise, in other examples, the orchestrator 116 can identify two end-user deployments that diverge from one another since, for instance, the output data received from the two end-user deployments reflect no shared peer group typologies. In this example, the orchestration engine 110A may provide a model update to one end-user deployment (but not the other) since the dissimilarity between the two end-user deployments may result in one model exhibiting more accurate prediction performance, while the other model exhibits a lower prediction performance.

Figure 4:
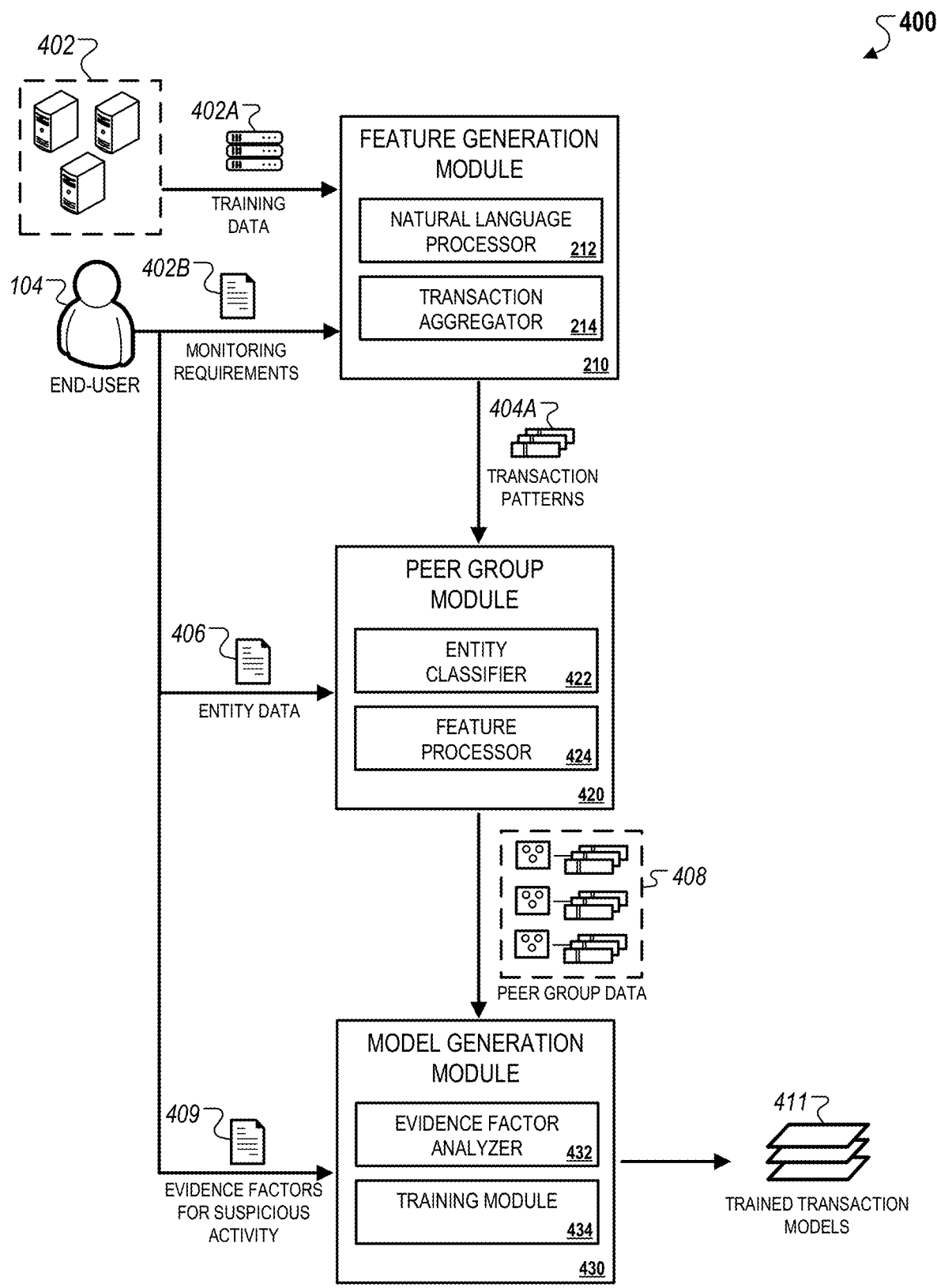
FIG. 4 is a diagram that illustrates an example of a technique that can be used to train an adaptive transaction processing system.
Figure 5:
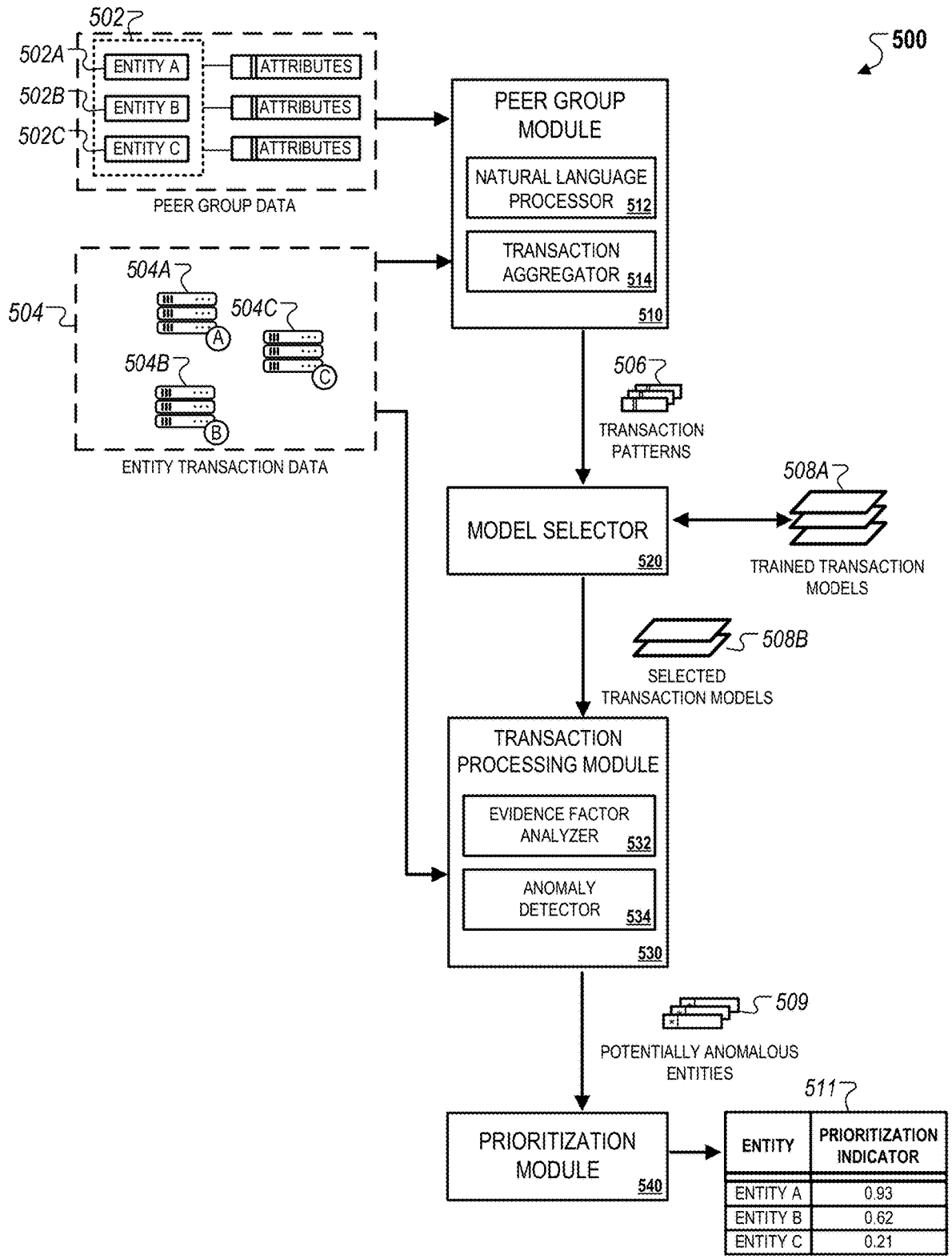
FIG. 5 is a diagram that illustrates an example of a technique that can be used to identify potentially anomalous activity of entities that are classified as belonging to a certain peer group.

In various implementations, the transaction processing device 110 can include additional software modules that perform various processes relating to training, generating, and applying transaction models to identify potentially anomalous activity (not shown in FIG. 1). For example, as shown in FIGS. 4 and 5, the transaction processing device 110 can include a feature generation module for identifying attributes associated with peer group classifications for entities. A peer group module can be used to classify entities within one or more peer groups given a set of known attributes for each peer group. Examples of such attributes include features of transactions, such as transaction value, whether the transaction is a reoccurring transaction, or information about entities in a peer group, such as physical location, online presence, or an identification of key personnel. The transaction processing module can also be used to train and/or apply a set of transaction models to identify patterns representing anomalous activity based on known patterns in training transaction data. The transaction processing module also applies trained transaction models to identify potentially anomalous activity given a set of evidence factors specified in the trained transaction models. A prioritization module processes the output of the transaction processing module to determine a prioritization indicator for an entity. As discussed throughout, a prioritization indicator represents a determined likelihood that an entity is associated with anomalous activity, e.g., a likelihood that transactions performed by the entity represent potentially anomalous activity.

The end-user devices 130A-C can represent any type of network-enabled device that is used by an end-user to access transaction data and/or other analysis techniques through, for instance, a web-based client portal or a software-based application. In some instances, the end-user devices 130A-C are each associated with an entity that receives analytics capabilities provided through the transaction processing device 110. For example, end-user device 130A can be a server of a banking institution that receives machine learning services through an application that is managed by the transaction processing device 110.

As other examples, end-user device 130B can be a server of a regulatory agency, and end-user device 130C can be a computing device of an employee of another regulatory agency. In these examples, the end-user devices 130A-C are intended to represent devices of distinct entities. For example, each of the end-user devices 130A-C can be managed by a different banking institution, a different regulatory agency, or the like. In this sense, transaction models deployed to each of the end-user devices 130A-C represent distinct deployments in that the transaction models are deployed to process transaction data not intended to be shared between the end-user devices 130A-C. For example, the transaction model deployed at end-user device 130A is used to process transaction data of account holders of a first bank, whereas the transaction model deployed at end-user device 130B is used to process transaction data of account holders of a second bank. In this example, the first and second bank may be competitors, and transaction data of each bank may be secured to prevent unauthorized access by the other bank.

FIG. 2 is a diagram that illustrates an example of a technique 200 for orchestrating updates between two machine learning deployments. In this example, the orchestration engine 110A orchestrates updates between two end-user devices 230A and 230B. Specifically, the orchestration engine 110A generates a model adjustment instruction 208 for a transaction model 242 based on output data 202 generated by applying transaction model 232 to transaction data 234 associated with the end-user device 230A.

As shown in FIG. 2, the technique 200 can be implemented as a sequence of steps shown in the figure. At step (1), the validator 112 receives output data 202 from a model processor 230A-1. The output data 202 includes transaction information, such as transactions identified by the transaction model 232 as representing potentially anomalous activity. For example, the output data 202 can include all transactions that were classified by the transaction model 232 as representing potentially anomalous activity.

At step (2), the validator 112 validates the output data 202 and provides validation results 204 to the aggregator 114. As discussed in reference to FIG. 1, the validator 112 can evaluate the output data 202 to determine that model parameters and/or weights included within the output data 202 represents a valid update to a transaction model. For example, the validator 112 can determine that the output data 202 indicates a valid adjustment if model parameters identified in the output data 202 are specified in output data generated by other transaction model deployments. As another example, the validator 112 can determine that the output data 202 indicates an invalid adjustment if a model parameter is not included in an existing model library associated with the transaction model 232.

At step (3), the aggregator 114 aggregates information contained in the output data 202 (e.g., model parameters, parameter weights) to generate aggregate output data 206. As shown in FIG. 2, the aggregate output data 206 includes an "average transaction value" of all entity transactions that were identified by the transaction model 232 to represent potentially anomalous activity. For example, the average transaction value for entity "BOB'S FOOD TRUCK" is "$30.65." In the example depicted in FIG. 2, the aggregate output data 206 includes aggregate data for entities classified in the "food truck" peer group classification (i.e., entities that perform transactions relating to selling food through a food truck). The aggregate output data 206 includes data for three entities (e.g., "BOB'S FOOD TRUCK," "TRUCK TACOS," "STREET FOOD DELIGHT") that are all included in the "food truck" peer group classification. As discussed throughout, entities belonging to the same peer group classification are entities that are identified to have similar attributes relating to transacting activity.

At step (3), the orchestrator 116 generates model adjustment data 206A based on evaluating the aggregate output data 206. The model adjustment data 206A includes model parameters and associated parameter weights identified by the model processor 230A-1 to be pertinent to a model update. The model parameters can be identified based on potentially anomalous activity predicted by the transaction model 232. In the example shown in FIG. 2, the model adjustment data 206A includes three model parameters, "transaction amount," "transaction frequency" and "payment type." In this example, the parameter weight represents a relative contribution of a given model parameter on the determination of potentially anomalous activity. For example, a parameter weight of "0.3" for a model parameter "transaction type" and a parameter weight of "0.15" for a model parameter "transaction amount" means that the transaction model 232 places a higher impact on "transaction type" in predicting whether a given transaction represents potentially anomalous activity.

As shown in FIG. 2, the model adjustment instruction 208 specifies an increase to a baseline value of the parameter weight of the model parameter "transaction amount" from "0.50" to "0.85." The orchestration engine 110A determines the adjustment in this example based on the transaction model 232 identifying a large number of potential anomalous transactions within the transaction data 234 with respect to transaction amounts for the "food trucks" peer group. For example, aggregate output data 206 specifies that the average transaction amount for "BOB'S FOOD TRUCK" is "$30.65," which is higher than the average transaction amounts of other comparable entities in the "food trucks" peer group ("TRUCK TACOS," "STREET FOOD DELIGHT"). The transaction model 232 determines that transactions associated with "BOB'S FOOD TRUCK" likely represents potentially anomalous activity given this discrepancy.

In the example shown in FIG. 2, the model adjustment data 206A increases the weight for model parameter "transaction amount" based on the transaction model 232 predicting potentially anomalous activity associated with "BOB'S FOOD TRUCK" with respect to transaction amount. In this example, the orchestration engine 110A determines that the predictions generated by the transaction model 232 (i.e., potentially anomalous transactions with respect to transaction amount) may be relevant to predictions to be subsequently generated by transaction model 242.

The orchestration engine 110A can determine that predictions generated by the transaction model 232 can be relevant to subsequent predictions to be generated by the transaction model 242 based on various factors. For example, if the transaction models 232 and 242 are deployed to evaluate transaction data of similarly classified entities (e.g., entities belonging to the same peer group classification), then the orchestration engine 110A determines that similar patterns may exist within the transaction data. As another example, if a parameter of transaction model 232 to be refined also exists in the model library of the transaction model 242, then the orchestration engine 110A determines that the refinement can improve the prediction performance of the transaction model 242. In yet another example, if both the transaction models 232 and 242 have previously identified potentially anomalous activity with respect to the same transaction parameter (e.g., "transaction amount"), then the orchestration engine 110A determines that a certain commonality exists between predictions generated by each transaction model. In each of these examples, the orchestration engine 110A determines that a refinement to a transaction parameter of one transaction model is likely relevant to the other transaction model. And, in this way, the orchestration engine 110A propagates iterative updates to multiple transaction models based on the prediction performance of a single transaction model.

At step (4), the orchestrator 116 transmits a model adjustment instruction 208 to model processor 230B-1. As shown in FIG. 2, the model adjustment instruction 208 specifies an adjustment to model library 244 by increasing a baseline weight of model parameter "transaction amount" from "0.50" to "0.85." As discussed above, the model adjustment instruction 208 adjusts the model weight given that the output data 202 indicates potentially anomalous activity identified by the transaction model 232 in the form of anomalous transaction amounts. In this example, the orchestration engine 110A determines that the transaction model 242 will more accurately identify potentially anomalous activity if the "transaction amount" parameter has a greater significance relative to other model parameters (e.g., "transaction frequency," "payment type"). Thus, by increasing the parameter weight, subsequent predictions generated by the transaction model 242 are more heavily biased towards transaction amount.

At step (5), the model processor 230B-1 updates the model library 244 of the transaction model 242 based on the model adjustment instruction 208. In the example shown in FIG. 2, the model processor 230B-1 increases a baseline value of "0.50" of the parameter weight of the model parameter "transaction amount" to the adjusted value of "0.85," as specified in the model adjustment instruction 208.

Though not depicted in FIG. 2, in some implementations, the model adjustment instruction 208 can specify other types of adjustments to the model library 244. In some instances, the adjustment involves removing an existing model parameter from the model library 244. In such instances, the adjustment is made based on the transaction model 232 not having identified potentially anomalous activity with respect to the existing model parameter (indicating that the model parameter and/or parameter weight is ineffective in predicting potentially anomalous activity).

In other instances, the adjustment involves adding a new model parameter to the model library 244. In such instances, the adjustment is made based on the output data 202 indicating a recent change to activity patterns of entity, such as changing the method of payment accepted during a transaction. The new activity patterns can be associated with a new model parameter and used for evaluation of potentially anomalous activity.

In some other instances, the adjustment involves adjusting peer group classifications specified within the model library 244 (e.g., adding a new peer group classification, removing a peer group classification, modifying the definition of existing peer group classifications). In such instances, the adjustment is made based on the output data 202 indicating that activity patterns of entities associated with the transaction data 234 have changed. For example, a new municipal regulation may prohibit operation of food trucks within a certain geographic location, resulting in existing food trucks to open storefront restaurants. In this example, the change in food service by entities may cause the entities to be classified within the "restaurant" peer group instead of the "food trucks" peer group. If no food trucks remain in the geographic location, then the orchestration engine 110A can update the model library 244 to remove the "food trucks" peer group.

Figure 3A:
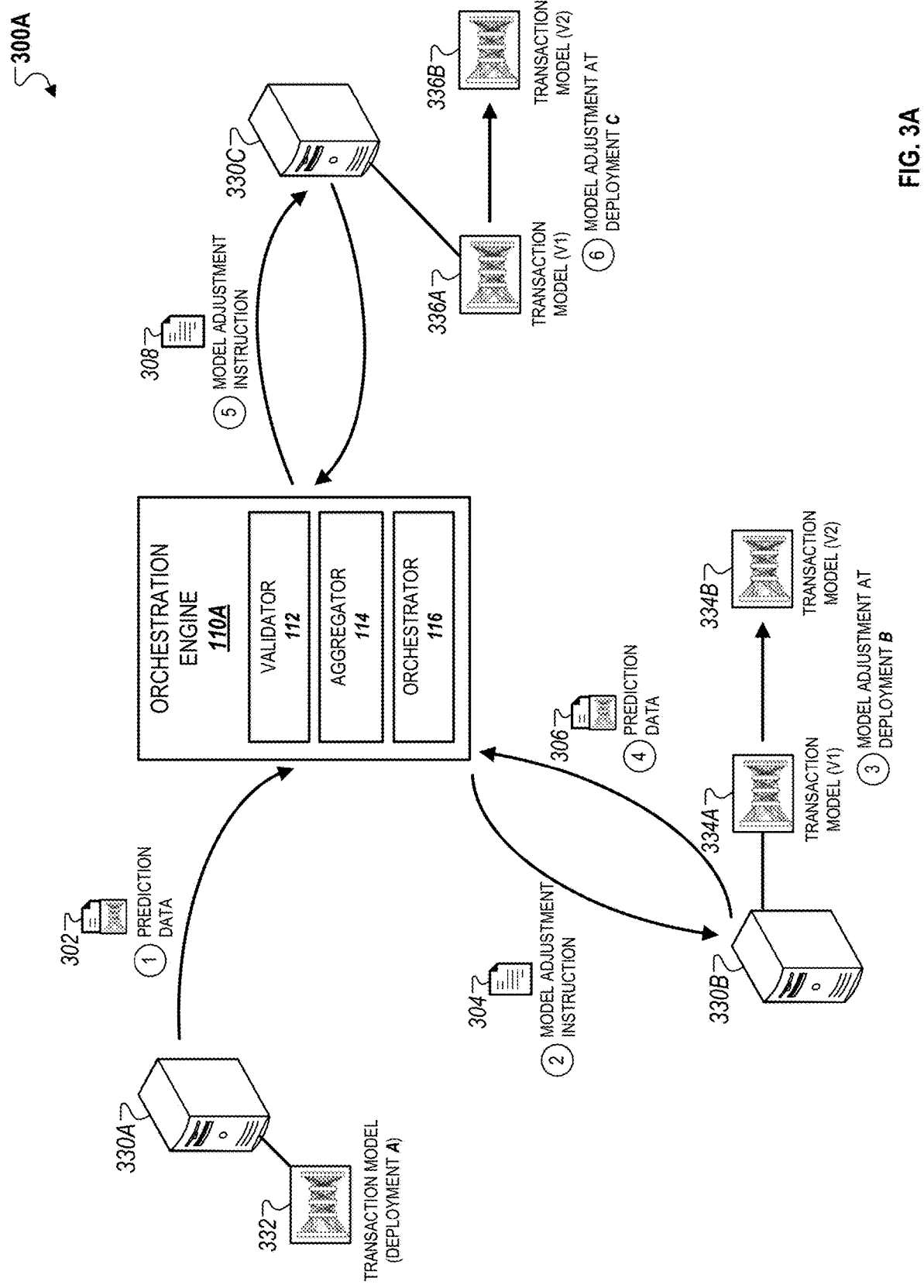
FIG. 3A is a diagram that illustrates an example of an iterative sequential orchestration technique for deploying updates between multiple transaction model deployments.

FIG. 3A is a diagram that illustrates an example of an iterative sequential orchestration technique 300A for deploying updates between multiple machine learning deployments. In this example, the orchestration engine propagates model updates sequentially between three end-user devices 330A, 330B, and 330C. As shown, the orchestration engine 110A updates transaction model 334A to transaction model 334B based on output data 302 generated by the transaction model 332. Afterwards, the orchestration engine 110A updates transaction model 336A to transaction model 336B based on output data 306 generated by transaction model 334B.

At step (1), the orchestration engine 110A receives output data 302 generated by transaction model 332 deployed at end-user device 330A. As discussed with respect to FIG. 2, output data 302 can include predictions generated by the transaction model 332 (e.g., potentially anomalous activity), peer group classifications applied by the transaction model 332, model parameters and model weights specified in an associated model library, among other types of information that may be useful to determine whether a model update should be sent to end-user devices 330B and 330C.

At step (2), the orchestration engine 110A provides a model adjustment instruction 304 to the end-user device 330B. As discussed with respect to FIG. 2, the model adjustment instruction 304 can specify, for instance, a change to a model weight of a model parameter, the addition of a new model parameter to a model library, the removal of an existing model parameter to the model library, or a change to peer groups used for predicting potentially anomalous activity.

At step (3), the end-user device 330B implements the model adjustment instruction 304 by updating transaction model 334A to transaction model 334B. The end-user device 330B can generate the transaction model 334B by updating an associated model library to include adjustment(s) specified by the model adjustment instruction 304.

At step (4), the orchestration engine 110A obtains output data 306 from the end-user device 3306. The output data 306 represents predictions generated by transaction model 334B based on evaluating transaction data associated with the end-user device 330B. The predictions are generated after the end-user device 330B implements the model adjustment instruction 304 in step (3) so that the output data 306 reflects predictions generating using the adjustment(s) specified by the model adjustment instruction 304 (e.g., adjusted parameter weight, new parameter, removed parameter).

At step (5), the orchestration engine 110A provides a model adjustment instruction 308 to the end-user device 330C. The model adjustment instruction 308 can be generated and provided in a similar manner as discussed above in reference to step (2).

At step (6), the end-user device 330C implements the model adjustment instruction 308 by updating transaction model 336A to transaction model 336B. The model adjustment instruction 308 can be implemented in a similar manner as discussed above in reference to step (3).

Figure 3B:
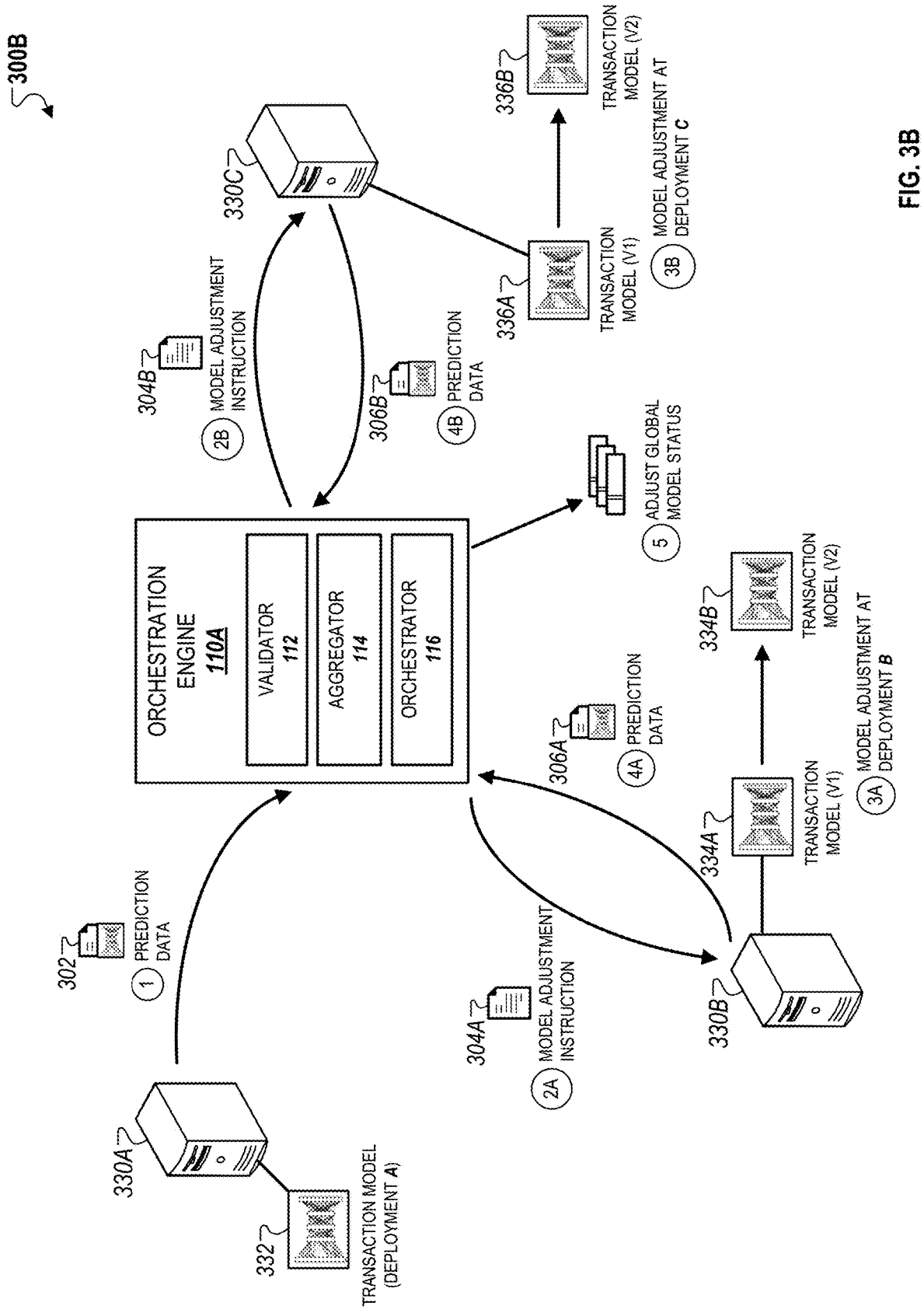
FIG. 3B is a diagram that illustrates an example of an iterative parallel orchestration technique for deploying updates between multiple transaction model deployments.

FIG. 3B is a diagram that illustrates an example of an iterative parallel orchestration technique 300B for deploying updates between multiple machine learning deployments. In this example, the orchestration engine propagates model updates in parallel between three end-user devices 330A, 330B, and 330C. As shown, the orchestration engine 110A updates transaction models 334A and 336A to transaction models 334B and 336B, respectively, based on output data 302 generated by the transaction model 332.

In contrast to the technique depicted in FIG. 3A, updates to transaction models 334A and 336B are implemented independently of one another, and in some instances, can be updated in an overlapping fashion (e.g., during an overlapping time period over which end-user devices 330B and 330C are provided with corresponding model adjustment instructions). In this way, output data generated at one end-user deployment (end-user device 330A) is used to update transaction models of multiple end-user deployments (end-user devices 330B and 330C). This type of architecture can be used if, for instance, the end-user device 330A is associated with a larger volume of transaction data relative to that of end-user devices 330B and 330C. Thus, data insights gained from output data generated by transaction model 332 may have a greater impact on subsequent prediction performance of transaction models 334A and 336A.

At step (1), the orchestration engine 110A receives output data 302 generated by transaction model 332 deployed at end-user device 330A in a similar manner as discussed in reference to step (1) of FIG. 3A. At steps (2A) and (2B), the orchestration engine 110A transmits model adjustment instructions 304A and 304B to end-user devices 330B and 330C, respectively, in a similar manner as discussed in reference to step (2) of FIG. 3A. At steps (3A) and (3B), end-user devices 330B and 330C update transaction models 334A and 336A, respectively, to transaction models 334B and 336B. At steps (4A) and (4B), the orchestration engine 110A obtains output data 306A and 306B from end-user devices 330B and 330C, respectively, in a similar manner as discussed in reference to step (4) in FIG. 3A.

At step (5), the orchestration engine 110A adjusts a global status associated with all transaction models deployed at end-user devices (e.g., transaction models 332, 334B, and 336B). The global status can be maintained, for example, in a lookup table within a database that identifies a version of each transaction model deployment. For example, the orchestration engine 110A receives data indicating that the end-user devices 330B and 330C implemented the model adjustment instruction, the orchestration engine 110A can update a record in the table corresponding to the updated transaction model.

In some instances, the orchestration engine 110A synchronizes transaction models deployed at each end-user device so that their versions match one another. In such instances, each time a transaction model is updated using the technique depicted in FIG. 3B, all other transaction models are updated using the same model update instruction to ensure that model libraries reference the same transaction model configuration (e.g., model parameters, parameter weights, peer groups). The global status, in these instances, is used by the orchestration engine 110A to ensure that transaction models deployed to end-user devices are up-to-date and reflect the newest configuration.

Alternatively, in other instances, the orchestration engine 110A can be configured to update transaction models asynchronously so that individual transaction models can have different versions and/or different configurations. In such instances, the orchestration engine 110A can determine to only update one transaction model (or a subset of deployed transaction models) instead of updating all models synchronously. The orchestration engine 110A uses asynchronous updates to only update transaction models that evaluate certain types of transaction data. For example, the orchestration engine 110A can update transaction models deployed at banking institutions but not update transaction models deployed at regulatory agencies. In this example, the banking institutions are associated with similar types of transaction data (e.g., transacting activity of bank accounts), but regulatory agencies can be associated with transaction data of entities included in a list of sanctioned entities.

FIG. 4 is a diagram that illustrates an example of a technique that can be used to train an adaptive transaction processing system 400. The system 400 includes a feature generation module 410, a peer group module 420, and a model generation module 430. The feature generation module 410 further includes a natural language processor 412 and a transaction aggregator 414. The peer group module 420 further includes an entity classifier 422 and a feature processor 424. The model generation module 430 further includes an evidence factor analyzer 432 and a training module 434. In some instances, the system 400 can be a sub-system of the system 100. For example, the system 400 can include software components that are executed by the transaction processing device 110 as discussed herein.

The system 400 determines anomalous activity in relation to a transaction context representing the nature of the transactions. To accomplish this, the system 400 applies a set of transaction models that are trained to identify a specific type of anomaly based on evaluating normalcy within the transaction context. For example, a transaction may be considered anomalous if evaluated for representing money laundering activity but not anomalous if evaluated for representing tax evasion. In this example, the system 400 applies different transaction models for money laundering activity and for tax evasion. The system trains and applies each model to identify different types of patterns reflecting the underlying activity. As discussed below, each model also specifies a set of evidence factors that the system uses as indicia to predict a likelihood that a transaction or entity is anomalous.

In general, the technique depicted in FIG. 4 can be used to train transaction models that are applied to predict the likelihood of potentially anomalous activity in a production environment. Once trained, each transaction model specifies a distinct set of evidence factors that are used to identify transaction patterns representing anomalous activity using machine learning techniques disclosed throughout.

Referring now to the process depicted in FIG. 4, the feature generation module 410 receives training data 402A from data sources 402 and monitoring requirements 402B from an end-user 104. The training data 402A includes anomalous activity that are verified by an end-user as representing anomalous activity for a peer group classification.

The feature generation module 410 also receives a set of monitoring requirements 402B specified by the end-user 104. The monitoring requirements 402B can specify transaction processing procedures that are used by an institution that evaluates transaction data for anomalous activity. For example, the monitoring requirements 402B can specify monitoring criteria used by an institution to satisfy regulatory reporting requirements. As another example, the monitoring requirements 402B can specify the types of transaction activity that are relevant to the customer from among data of its customers.

In processing the contents of the training data 402A, the natural language processor 412 identifies transaction information used for identification and analysis. For example, the natural language processor 412 can classify transactions in the training data 402 as belonging to certain transaction categories, segment transactions that are associated with the same entity, among others. In some instances, the training data 402A is formatted as a table that includes plain text and labels that reference structured variables. For example, the table can include a label indicating that a transaction was included in a Suspicious Activity Report and a record that includes a narrative description of suspicious behavior associated with the transaction that resulted in the transaction being included in the Suspicious Activity Report. Once identified and parsed by the natural language processor, the transaction information is then provided to the transaction aggregator 414.

In some implementations, the natural language processor 412 can generate features from unstructured text data associated with transaction information, such as wiring instructions from an account holder, bank teller comments. The features can be generated based on identifying the presence of text segments corresponding to specific information (e.g., text identifying an entity associated with a transaction), or making inferences based on processing and/or evaluating linguistic features identified in text (e.g., identifying possible suspicious activity based on a bank teller's notes for a deposit).

The transaction aggregator 414 identifies a transaction type of each transaction included in the entity transaction data and aggregates the transactions into a set of transaction patterns. For example, the transaction aggregator 414 can identify different types of transaction fields referenced in the training data 402A, and transaction classifications for transactions identified by the natural language processor 412 within the training data 402A. The transaction aggregator 414 also determines a set of normalized patterns present within the training data 402A that are used to determine whether entity activity represents potentially anomalous activity. In some instances, the transaction aggregator 414 can identify a transaction type of the transactions based on processing unstructured text data associated with transaction information in a similar manner as discussed above in reference to the natural language processor 412.

The feature generation module 410 generates transaction patterns 404 based on the output of the transaction aggregator 414. For example, the feature generation module 410 can identify patterns, such as patterns are shared by transactions of the same type, patterns that are shared by transactions of the same types of entities. As examples, transaction patterns can include average transaction value, transaction frequency, among others.

The peer group module 420 generates peer group data 408 based on the transaction patterns 404 and entity data 406. The peer group data 408 classifies entities within the entity data 406 within specified peer groups based on shared attributes. The peer group data 408 can identify entities that are assigned to each peer group, and a set of attributes that are shared amongst the entities of the same peer group. For example, the peer group data 408 can identify a peer group that includes money service businesses and another peer group that includes banks. In this example, the peer group including money service businesses specifies attributes unique to money service businesses, such as transactions involving cashier's checks, money orders, or traveler's checks. In contrast, the peer group including banks specifies a set of attributes unique to banks, such as customer financial transactions, account deposits and withdrawals, or wire transfers.

The model generation module 430 trains a set of transaction models using the peer group data 408 and evidence factor data 409 to generate trained transaction models 411. As discussed above, the transaction models can be training using different training techniques, such as supervised learning, unsupervised learning, or reinforced learning, depending on the application of the transaction model. Each transaction model can be associated with a distinct set of evidence factors that are applied to identify transaction patterns representing anomalous activity relative to a specified peer group. In this manner, the trained transaction models 411 can be applied to different peer groups to dynamically identify anomalous activity in different transactional contexts. For example, when applying a transaction model for money laundering, a transaction for a peer group including money services can be found to be anomalous. In this example, if the system applies the same transaction model to the same transaction, but for a different peer group that includes bank, the transaction can be found to not be anomalous due to differences in attributes amongst the two peer groups. In this respect, the determination of anomalous activity is contextualized by the attributes specified by each peer group.

FIG. 5 is a diagram that illustrates an example of a technique that can be used to identify potentially anomalous activity of entities that are classified as belonging to a certain peer group. The system 500 includes a peer group module 510, a model selector 520, a transaction processing module 530, and a prioritization module 540. The peer group module 510 further includes a natural language processor 512 and a transaction aggregator 514. The transaction processing module 530 further includes an evidence factor analyzer 532 and an anomaly detector 534. In some instances, the system 500 can be a sub-system of the system 100. For example, the system 500 can include software components that are executed by the transaction processing device 110 as discussed herein.

In general, the technique depicted in FIG. 5 can be used to apply trained transaction models in a production environment to identify potentially anomalous activity in transaction data using the adaptive transaction processing techniques described throughout. As described below, transaction models representing different transaction patterns can be used to vary the type of anomalous activity to be identified. Additionally, because anomalous activity for a particular entity is identified relative to activities of other entities that are classified as belonging to the same peer group as the particular entity, the likelihood of identifying false positives and false negatives is reduced by contextualizing the prediction process.

Referring now to the process depicted in FIG. 5, the peer group module 510 receives peer group data 502. The peer group data 502, in this example, identifies for entities 502A, 502B, and 502C. The entity transaction data 504 includes transaction data for each entity identified in the transaction data, e.g., transaction data 504A for entity 502A, transaction data 504B for entity 502b, and transaction data 504C for entity 502C. Entities 502A-C are classified as belonging to the same peer group. The peer group is associated with a set of attributes of the entities 502A-C, e.g., business classification, industrial sector, transaction volume, geographic location, etc.

The peer group module 510 also receives entity transaction data 504 for the entities 502A-C. In some instances, the entity transaction data 504 is obtained from a data upload provided by the regulator, e.g., using batch data upload through a batch management module. In other instances, the entity transaction data 504 is extracted from an associated database, such as a database associated with computing devices 130A-C that stores transaction data for entities that are monitored by the end-user 104. In some other instances, the entity transaction data 504 is obtained from an external data source, i.e., a data source that is external from, and independently managed by, a third-party data provider that is independent and distinct from the institution associated with the end-user 104. For example, the entity transaction data 504 can include web presence data of entities 502-C representing online activities performed by entities. In other examples, the entity transaction data 504 includes information obtained from public records, such as court filings, sanction lists, among others.

The natural language processor 512 processes the entity transaction data 504 in a similar manner as discussed above with respect to the natural language processor 212. For example, the natural language processor 512 can classify transactions in the entity transaction data 504 as belonging to certain transaction categories, segment transactions that are associated with the same entity, among others. The transaction information is then provided to the transaction aggregator 514.

The transaction aggregator 514 identifies transaction patterns 506 based on processing the peer group data and the data generated by the natural language processor 512. The transaction patterns 506 can include a set of filtered information that represent pertinent portions of the entity transaction data 504 or transaction fields included within the transaction data. The transaction patterns 506 are provided as input to the model selector 520 to identify the appropriate transaction model to apply in analyzing the transaction patterns 506.

The model selector 520 selects a set of transaction models 508B from among a set of trained transaction models 508A based on the transaction patterns 506. Each transaction model included in the trained transaction models 508A can identify transaction patterns representing a different type of anomalous activity, whereas the selected transaction models 508B can represent transaction models identifying patterns of interest to an end-user. For example, if the end-user is a bank compliance officer that is interested in identifying suspicious transaction activities its customers, then the model selector 520 can select only those transaction models that are relevant to identifying suspicious activities associated with bank accounts. In this example, the model selection process is used by the system 500 to customize the transaction processing techniques employed by the transaction processing module 530 in identifying potentially anomalous activity. In some instances, the model selector 520 can select multiple transaction models from among the trained transaction models 508A to ensure that the entity transaction data 504 is simultaneously evaluated with respect to different types of transaction patterns. For example, a transaction model for possible money laundering activity can be selected along with another transaction model for possible tax evasion activity to permit the transaction processing module 530 to identify transactions that are predicted to be implicated with either type of activity or both types of activity. In some instances, the application of multiple transaction models enables the system 500 to identify those transactions that represent transaction patterns for different types of potentially anomalous activity, which can then be used to adjust the computation of prioritization indicators. For example, a transaction or entity that is identified to be associated with transaction patterns of multiple transaction models can be designated to have a higher prioritization score than other transactions or entities that are identified to only be associated with a single transaction model. In this example, a larger number of transaction patterns being associated with a single transaction or a single identity increases the likelihood that the transaction or entity is associated with anomalous activity, and is thereby assigned a higher prioritization score.

The transaction processing module 530 processes the entity transaction data 504 using the selected transaction models 508B to identify potentially anomalous entities 509 within the entity transaction data 504. As discussed above, the transaction processing module 530 identifies potentially anomalous activity based on comparing transaction patterns of transactions within the entity transaction data 504 and transaction patterns specified by the selected transaction models 508B, and using statistical inference techniques to determine whether the similarity satisfies specified thresholds. Additionally, the potentially anomalous activity of an entity represents those transactions that have attributes that differ from the attributes of transactions of other entities that are classified to the same peer group as the entity.

In some implementations, the transaction process module 530 additionally, or alternatively, identifies potentially anomalous entities from among the entities identified in the peer group data 502. For example, the transaction processing module 530 can identify the entity 502A as representing an anomalous entity if transactions within the transaction data 504A have attributes that deviate from the shared attributes specified within the peer group data 502. In another example, the transaction processing module 530 can identify the entity 502A as representing an anomalous entity if transaction data 504A includes transactions deviate from prior recurring transactions that are identified as being frequently performed by the entity 502A.

The prioritization module 540 generates a table 511 that indicates a prioritization indicator for each entity within the potentially anomalous entities 509. In the example depicted in FIG. 5, the table 511 includes a prioritization score that is computed for each entity. For instance, the entity 502A has a score with a value of 0.93, which indicates that this entity has been determined to be most likely to be associated with anomalous activity from among the other entities in the peer group data 502, such as the entities 502B and 502C. In some other examples, the table 511 can include prioritization indicators for transactions included in the entity transaction data 504. In such examples, the table 511 identifies potentially anomalous transactions based on transactions patterns specified in the selected transaction models 508B, and relative to other transactions within the entity transaction data 504, other transactions associated with the same entity, or both.

In some implementations, the system 500 can use similar techniques to process the entity transaction data 504 on a transaction-by-transaction basis, i.e., identifying potentially anomalous transactions within the entity transaction data 504. In such implementations, the prioritization module 540 can compute a prioritization indicator for each potentially anomalous transaction that is identified as well as a prioritization indicator for entities 502A, 502B, and 502C. In some instances, the prioritization module 540 computes the prioritization indicator for a particular entity based on combining the prioritization indicators for all potentially anomalous transactions identified for that particular entity. For example, if the system 500 identifies three potentially anomalous transactions for the entity 502A within the transaction data 504A, the prioritization indicator for the entity 502A within the table 511 is computed based on combining the three prioritization indicators for the three transactions.

Figure 6:
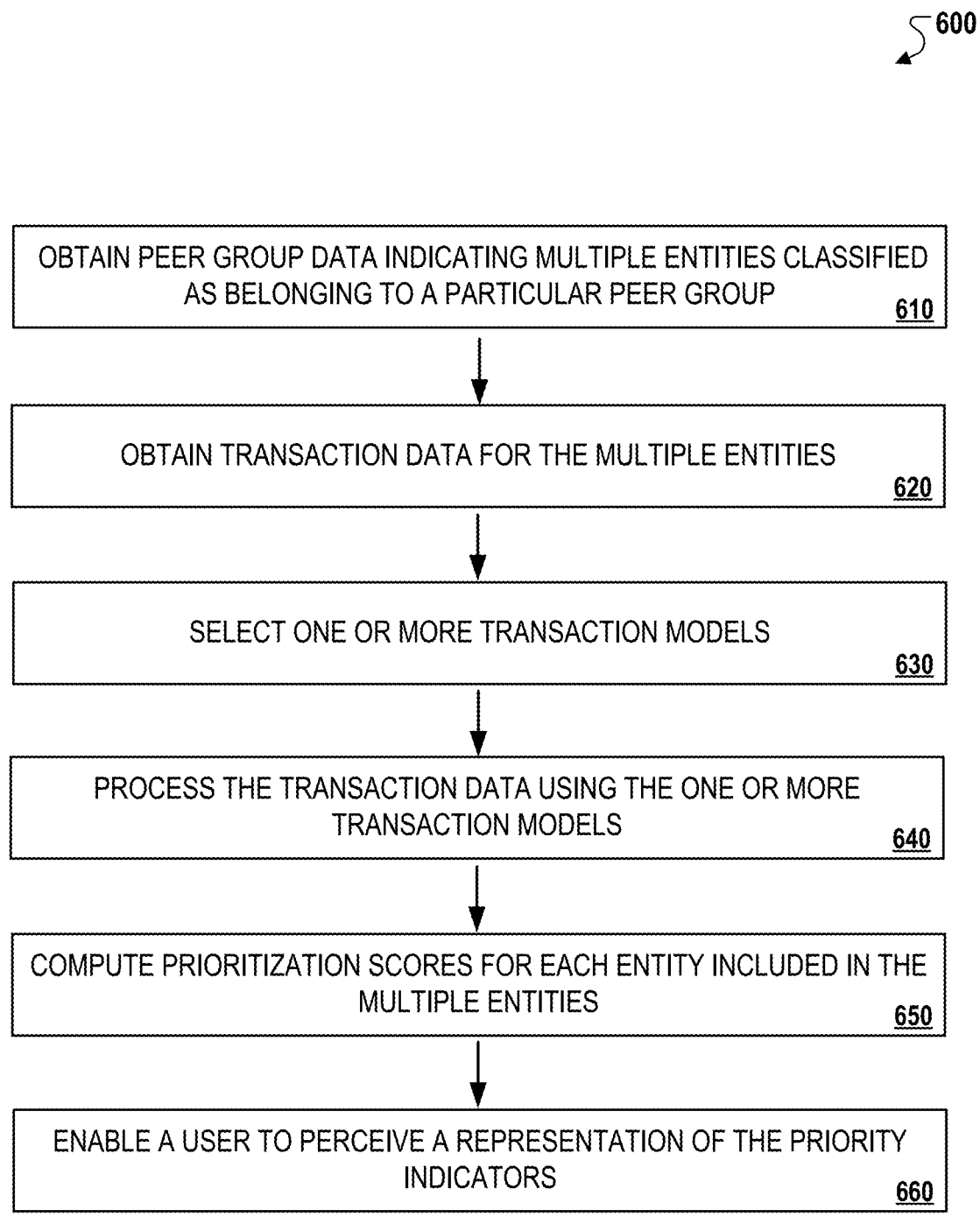
FIG. 6 is a flowchart that illustrates an example of a process for computing prioritization scores for entities based on the identification of potentially anomalous activity.

FIG. 6 is a flowchart that illustrates an example of a process 600 for computing prioritization scores for entities based on the identification of potentially anomalous transactions. Briefly, the process 600 includes the operations of obtaining peer group data indicating multiple entities classified as belonging to a particular peer group (610), obtaining transaction data for the multiple entities (620), selecting one or more transaction models (630), processing the transaction data using the one or more transaction models (640), computing prioritization scores for each entity included in the multiple entities (650), and enabling a user to perceive a representation of the priority indicators (660).

In more detail, the process 600 includes the operation of obtaining peer group data indicating multiple entities classified as belonging to a particular peer group (610). The transaction processing device 110 can obtain peer group data 502 for multiple entities 502A-C. As discussed above in reference to FIG. 5, the peer group data 502 can identify the entities 502A-C as belonging to a particular peer group, e.g., money service businesses in a particular geographic location. The peer group data 502 also identifies a set of attributes associated with the multiple entities. In some instances, the features can be human-interpretable features, i.e., features that can be understood by an end-user as describing a type of entity.

The features identified in the peer group data 502, can represent different types of attributes of the entities 502A-C. In some implementations, the set of attributes includes an attribute representing a business classification shared by the multiple entities. For example, the peer group data can identify entities as being classified as money service businesses that perform transactions in Washington D.C.

As discussed throughout, the attributes can identify a geographic location in which the entities perform transactions, types of transactions that are frequently executed by the entities, an average transaction value for transactions performed by the entities, a regulatory reporting protocol that governs transactions performed by the entities, among others.

The process 600 includes the operation of obtaining transaction data for the multiple entities (620). The transaction processing device 110 can obtain entity transaction data 504 for multiple entities 502A-C. The entity transaction data 504 includes transactions 504A-C for each of the entities 502A-C, respectively.

The process 600 includes the operation of selecting one or more transaction models (630). The transaction processing device 110 can select one or more transaction models 508 from among trained transaction models 508A. Each transaction model within the trained transaction models 508A may apply a particular set of evidence factors corresponding to the set of attributes associated with multiple entities and identify potentially anomalous entities from among the multiple entities. For example, three transaction models can each be associated with a set of evidence factors that are applied to distinguish potentially anomalous transaction activity relative to normalized transaction activity associated with a peer group. In this example, a first transaction model is trained to identify transaction activity indicating money laundering based on applying evidence factors such as the presence of large numbers of layered transactions from unidentifiable sources within transaction data for a particular entity.

The process 600 includes the operation of processing the transaction data using the one or more transaction models (640). The transaction processing device 110 can process the transaction data to identify potentially anomalous transactions within the transaction data for the multiple entities using selected transaction models. For example, multiple transaction models can be selected and used to process transaction data for entities assigned to a peer group. In this example, the transaction processing device 110 identifies transaction anomalies that are likely to represent money laundering activity and terrorist funding.

As discussed above, the transaction processing device 110 can evaluate different types of potentially anomalous activity. In some implementations, the transaction processing device 110 evaluates potential anomalies with respect to normalized transactions associated with a particular entity. For example, if historical transaction data indicates that the average transaction value of transactions for an entity is $500, then a transaction with a transaction value of $5,000 can be identified as a potentially anomalous transaction relative to other verified transactions associated with the entity. Such a transaction might be normal for another entity.

In other implementations, the transaction processing device 110 evaluates potential anomalies with respect to normalized transactions associated with other entities that are classified as belonging to the same peer group as a particular entity. For example, if historical transaction data for all entities assigned to the peer group indicates that the average transaction value of transactions is $1,000, then a transaction with a transaction value of $10,000 can be identified as a potentially anomalous transaction (irrespective of whether the transaction value resembles the transaction values of other prior transactions of the entity).

In some other implementations, the transaction processing device 110 can evaluate potential anomalies relative to both transactions of a particular entity and transactions of other entities assigned to the same peer group as the particular entity. For example, the transaction processing device 110 can use a weighting technique that combines an anomaly assessment relative to transactions of other entities and an anomaly assessment relative to other transactions of the particular entity.

As discussed throughout, the transaction processing device 110 is capable of using various techniques to increase transaction processing throughput such that the identification of potentially anomalous activity can be performed within a specified time period after transaction data is obtained by the transaction processing device 110. For example, transaction activity of account holders of a banking institution during a particular day can be electronically recorded by a data server of the banking institution by 5 PM ET, and provided to the transaction processing device 110 by 7 PM ET. In this example, because potentially anomalous transactions are reported to the banking institution on a daily basis, the banking institution can take action on associated account holders more quickly than if, for example, transaction data is processed on a weekly or monthly basis. In some instances, the transaction processing device 110 can configured use different types of processing techniques to enable a configurable time period within which potentially anomalous activity is identified. For example, the transaction processing device 110 can use a lower accuracy but higher speed processing technique for higher activity reporting frequencies, e.g., daily reporting, and a higher accuracy but lower speed processing technique for lower activity reporting frequencies, e.g., month reporting.

Additionally, the transaction processing device 110 is capable of processing the transaction data with reduced latency compared to analogous manual processing techniques. For example, the transaction processing device 110 can process a volume of transaction information in a time period that is shorter than the time period to manually process the same volume of transaction information and outperforms existing [static systems] as it relates to utility and precision. In some instances, due to the large volume of transaction information required to accurately identify potentially anomalous activity, the time period to manually process transaction data is so high that it renders the processing useless or obsolete. For example, it may take a human (or a group of humans) approximately one to two weeks to review a large volume of transaction information transaction data collected over a one-month time period. However, given that the processing time period, e.g., one to two weeks, is roughly half of the time period over which transaction data is collected, e.g., one month, then the potentially anomalous activity identified may no longer be relevant to current activity if the entity has changed their activity pattern during the processing time period. Faster processing time using the automated techniques described herein address this inherent limitation by reducing the time period required to identify potentially anomalous activity so that end-users can identify activity patterns that are more likely to represent present activity patterns.

In some implementations, the transaction processing device 110 obtains and processes transaction data on a periodic basis. For example, the transaction processing device 110 can periodically obtain transaction data for the multiple entities, e.g., on a weekly basis, as transaction data instances that are obtained at specified times, e.g., each Monday of a new week. In such implementations, the transaction processing device 110 can process each transaction data instance to identify potentially anomalous activity within each transaction data instance for the multiple entities. For example, the transaction processing device 110 can process the weekly transaction data to identify potentially anomalous activity for each week and report the findings to the end-user by Sunday of the same week.

The process 600 includes the operation of computing prioritization scores for each entity included in the multiple entities (650). The transaction processing device 110 can compute prioritization indicators for entities that are classified as belonging to a particular peer group. In some implementations, the prioritization indicators are numerical values that reflect a likelihood that an entity is associated with at least one potentially anomalous transaction. For example, a table can include prioritization scores with values representing probabilities that entity transaction data includes at least one potentially anomalous transaction. In other implementations, the prioritization indicators are labels representing categorizations for each entity. For example, a prioritization indicator can be one of a "HIGH," "MEDIUM," or "LOW", where that label that indicates the assessed likelihood that an entity is associated with a potentially anomalous transaction.

The process 600 includes the operation of enabling a user to perceive a representation of the priority indicators (660). For example, the transaction processing device 110 can provide data representing the priority indicators for output to the one of end-user devices 130A-C. As discussed above, an end-user can be a regulator associated with a regulating financial institution that reviews transaction data for suspicious activity, e.g., fraudulent transactions, money laundering, financing criminal activity, among other types of financial crimes. In some implementations, the computing devices 130A-C access the output data through a webpage-based portal that allows the end-user to access data generated by the transaction processing device 110. Alternatively, in other implementations, the computing devices 130A-C can run an application that provides the end-user with access to the prioritization indicators. For example, the computing devices 130A-C can be desktop computing devices that run a software through which the prioritization indicators are displayed for output. As another example, the computing devices 130A-C can be mobile computing devices that run a mobile application through which the prioritization indicators are displayed for output.

Figure 7:
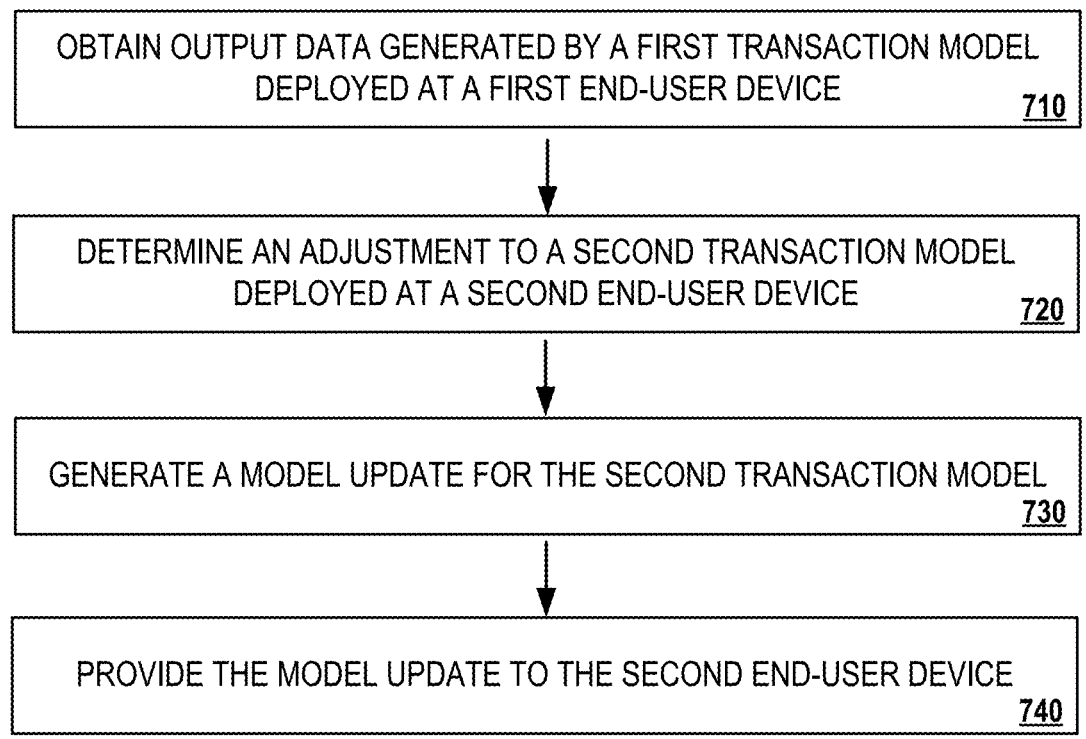
FIG. 7 is a flowchart that illustrates an example of a process for orchestrating updates among multiple machine transaction model deployments.

FIG. 7 is a flowchart that illustrates an example of a process 700 for orchestrating updates among multiple transaction model deployments. Briefly, the process 700 includes the operations of obtaining output data generated by a first transaction model deployed at a first end-user device (710), determining an adjustment to a second transaction model deployed at a second end-user device (720), generating a model update for the second transaction model (730), and providing the model update to the second end-user device (740).

In more detail, the process 700 includes the operation of obtaining output data generated by a first transaction model deployed at a first end-user device (710). For example, the orchestration engine 110A can obtain output data 202 generated by transaction model 232 deployed at the end-user device 230A. As discussed above, the output data 202 can include transaction parameters associated with potentially anomalous activity identified by the transaction model 232 within the transaction data 234, and model weights associated with the transaction parameters. In some instances, the output data 202 is devoid of any identifying transaction information (e.g., underlying information associated with potentially anomalous activity) to prevent the transmission of sensitive information between the end-user device 230A and the orchestration engine 110A. Alternatively, in other instances, the output data 202 includes transaction data that has been predicted by the transaction model 232 as representing potentially anomalous activity.

The process 700 includes the operation of determining an adjustment to a second transaction model deployed at a second end-user device (720). For example, the orchestration engine 110A determines an adjustment to transaction model 242 deployed at the end-user device 230B. As discussed above, the orchestration engine 110A determines an adjustment based on processing the output data 202, and determining that a refinement to model configuration can improve upon the prediction performance of the transaction model 242. In the example depicted in FIG. 2, the output data 202 identifies potentially anomalous activity in the form of an unusually high transaction amount for transactions associated with the "BOB'S FOOD TRUCK" entity. The orchestration engine 110A uses this to determine that transaction data associated with the end-user device 230B may also be likely to have similar types of potentially anomalous activity (e.g., transactions with unusually high transaction amounts).

The process 700 includes the operation of generating a model update for the second transaction model (730). For example, the orchestration engine 110A generates a model adjustment instruction 208 for the transaction model 242. In the example depicted in FIG. 2, the model adjustment instruction 208 specifies a change to the model weight for model parameter "transaction amount" from "0.5" to "0.85." In this example, the increase in model weight is based on the orchestration engine 110A determining that transaction data associated with the end-user device 230B is likely to have potentially anomalous activity with unusually high transaction amounts. This determination is based on the predictions generated by the transaction model 232 (indicating potentially anomalous activity with higher than usual transaction amounts). As discussed above, the model adjustment instruction 208 adjusts the model library 244 associated with the transaction model 242.

The process 700 includes the operation of providing the model update to the second end-user device (740). For example, the orchestration engine 110A provides the model adjustment instruction 208 to the end-user device 2308. The end-user device 230B then implements the model adjustment by modifying the model library 244 associated with the transaction model 242. For example, the end-user device 230B updates a baseline model weight of the model parameter "transaction amount" that is specified in the model library 244 ("0.5") to match the value specified in the model adjustment instruction 208 ("0.85"). Once implemented, the updated transaction model 242 is configured to bias predicting potentially anomalous activity more heavily towards transaction amount. For example, the transaction amount of a given transaction is weight more heavily relative to other attributes (e.g., transaction type, payment type, transaction time) in determining whether the given transaction of an entity represents potentially anomalous activity with respect to transaction activity of other entities classified in the same peer group as the entity.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems.

The invention claimed is:

1. A computer-implemented method comprising:
   obtaining, by a server system, output data generated by a first transaction model deployed at a first end-user device, wherein:
     the first transaction model is trained to apply a set of evidence factors to predict a likelihood that first transaction data received by the first end-user device, or a first target entity transmitting the first transaction data from the first end-user device, is anomalous with respect to a plurality of peer groups, and
     each peer group included in the plurality of peer groups is associated with a set of attributes, wherein:
       (i) the set of attributes include an entity classification,
       (ii) each peer group is associated with the entity classification, and
       (iii) each peer group is associated with a level of similarity shared between the set of attributes;
   evaluating, by the server system, the output data in relation to the plurality of peer groups;
   classifying, by the server system and based on the set of attributes corresponding to the entity classification of the first target entity, the first target entity or a second target entity as belonging to at least:
     (i) a first peer group of entities that share a first set of attributes and
     (ii) a second group of entities that share a second set of attributes;
   processing, by the server system and using the trained first transaction model, the transaction data for the first target entity or the second target entity in relation to the transaction data for entities included in the first peer group to determine a first indicator for the first target entity or the second target entity, wherein the first indicator represents a first classification of normalcy relative to transaction data of the first peer group with respect to an activity pattern type given the first set of attributes, wherein:
     (i) a first classification of normalcy corresponds to expected activity associated with the transaction data of the first peer group and
     (ii) the first target entity is determined anomalous when an activity of the first target entity deviates beyond a threshold from the expected activity of other entities in the first peer group of entities;
   determining, by the server system, based on the first indicator, that the transaction data for the first target entity, having the set of attributes corresponding to the entity classification, and the second target entity is (i) potentially anomalous relative to the first classification of normalcy relative to the transaction data and with respect to the activity pattern type and (ii) not potentially anomalous relative to a second classification of normalcy represented by a second indicator indicating the second classification of normalcy relative to transaction data of a second peer group with respect to the activity pattern type given the second set of attributes, wherein a first classification of normalcy corresponds to expected activity associated with the transaction data of the first peer group;
   in response to determining that the transaction data is potentially anomalous relative to the first classification of normalcy and is not potentially anomalous relative to the second classification of normalcy:
     adjusting, by the server system, the activity pattern type;
     generating, by the server system, a second set of evidence factors based on the adjusted activity pattern type;
     re-training, by the server system, the first transaction model using the second set of evidence factors to identify potentially anomalous activity associated with the adjusted activity pattern type;
     generating, by the server system and based on the re-training of the first transaction model, a model update specifying an adjustment for a second transaction model deployed at a second end-user device, wherein the second transaction model is initially trained to apply the first set of evidence factors, the model update specifying a change to the second transaction model derived from the re-training of the first transaction model; and
     providing, by the server system, the model update for output to the second end-user device, wherein the model update, when received by the second end-user device, causes the second end-user device to adjust the second transaction model according to the change specified by the model update.

2. The method of claim 1, wherein the output data comprises:
   a set of model parameters associated with the first target entity; and
   a respective model weight for each model parameter included in the set of model parameters.

3. The method of claim 2, wherein:
   the first transaction model is trained to identify the potentially anomalous activity associated with the first target entity by applying the set of evidence factors to transaction data associated with the first target entity; and
   the output data excludes the transaction data associated the first target entity.

4. The method of claim 2, wherein:
   the second transaction model is trained to identify the potentially anomalous activity associated with the second target entity based on a second set of model parameters; and
   the adjustment for the second transaction model comprises removing a model parameter included in the set of model parameters associated with the first target entity and the second set of model parameters associated with the second target entity.

5. The method of claim 2, wherein:
   the second transaction model is trained to identify the potentially anomalous activity associated with the second target entity based on a second set of model parameters; and
   the adjustment for the second transaction model comprises adding a model parameter included in the set of model parameters associated with the first target entity and not included in the second set of model parameters associated with the second target entity.

6. The method of claim 2, wherein:
the second transaction model is trained to identify the potentially anomalous activity associated with the second target entity based on a second set of model parameters; and
the adjustment for the second transaction model comprises adjusting a model weight of a model parameter included in the set of model parameters associated with the first target entity and the second set of model parameters associated with the second target entity.

7. The method of claim 1, wherein:
the output data comprises a peer group of entities that share the first set of attributes with the first target entity and the second target entity; and
the adjustment for the second transaction model comprises a change to a peer group classification for the second target entity.

8. The method of claim 7, further comprising:
receiving, by the server system and from the second end-user device, an indication that the second transaction model was adjusted based on the model update; and
based on receiving the indication that the second transaction model was adjusted based on the model update, providing, by the server system and to the second end-user device, an instruction, that when received by the second end-user device, causes the second end-user device to perform operations comprising:
classifying second target entity to the peer group classification that was changed based on the model update;
obtaining, from one or more data sources, transaction data for the first target entity and transaction data for entities included in the peer group classification that was changed based on the model update;
processing, using the second transaction model, the transaction data for the second target entity in relation to the transaction data for entities included in the peer group classification that was changed based on the model update to determine a prioritization indicator for the second target entity; and
enabling a user to perceive a representation of the prioritization indicator.

9. The method of claim 8, wherein:
the prioritization indicator comprises a score; and
a value of the score represents a number of potentially anomalous transactions included in the transaction data for the second target entity.

10. The method of claim 9, wherein a value of the score represents a probability that set of transactions of the second target entity are determined to be anomalous relative to entities included in the peer group that was adjusted based on the model update and to which the second target entity was classified.

11. The method of claim 1, further comprising:
receiving, by the server system and from the second end-user device, an indication that the second transaction model has been adjusted according to the change specified by the model update;
obtaining, by the server system, second output data generated by second transaction model after being adjusted according to the change specified by the model update;
determining, by the server system, an adjustment for a third transaction model deployed at a third end-user device, wherein the third transaction model is trained to apply the set of evidence factors to identify potentially anomalous activity associated with a third target entity determined to be similar to the second target entity;
generating, by the server system, a model update for the third transaction model, wherein the model update for the third transaction model specifies a change to the third transaction model; and
providing, by the server system, the model update for the third transaction model for output to the third end-user device, wherein the model update, when received by the third end-user device, causes the third end-user device to adjust the third transaction model according to the change specified by the model update for the third transaction model.

12. The method of claim 1, wherein:
evaluating the output data in relation to the plurality of peer groups comprises determining a number of peer groups specified within the output data; and
determining the adjustment for the second transaction model comprises:
determining that the number of peer groups specified within the output data satisfies a first threshold, and
determining to adjust the second transaction model based on determining that the number of peer groups specified within the output data satisfies the first threshold.

13. The method of claim 1, wherein:
evaluating the output data in relation to the plurality of peer groups comprises determining a number of sets of attributes specified within the output data; and
determining the adjustment for the second transaction model comprises:
determining that the number of sets of attributes specified within the output data satisfies a second threshold, and
determining to adjust the second transaction model based on determining that the number of peer groups specified within the output data satisfies the second threshold.

14. A system comprising:
one or more computing devices; and
one or more storage devices storing instructions that, when executed by the one or more computing devices, causes the one or more computing devices to perform operations comprising:
obtaining, by the one or more computing devices, output data generated by a first transaction model deployed at a first end-user device, wherein:
the first transaction model is trained to apply a set of evidence factors to predict a likelihood that first transaction data received by the first end-user device, or a first target entity transmitting the first transaction data from the first end-user device, is anomalous with respect to a plurality of peer groups, and
each peer group included in the plurality of peer groups is associated with a set of attributes, wherein:
(i) the set of attributes include an entity classification,
(ii) each peer group is associated with the entity classification, and
(iii) each peer group is associated with a level of similarity shared between the set of attributes;
evaluating, by the one or more computing devices, the output data in relation to the plurality of peer groups;
classifying, by the one or more computing devices and based on the set of attributes corresponding to the entity classification of the first target entity, the first target entity or a second target entity as belonging to at least (i) a first peer group of entities that share a first set of attributes and (ii) a second group of entities that share a second set of attributes;

processing, by the one or more computing devices and using the trained first transaction model, the transaction data for the first target entity or the second target entity in relation to the transaction data for entities included in the first peer group to determine a first indicator for the first target entity or the second target entity, wherein the first indicator represents a first classification of normalcy relative to transaction data of the first peer group with respect to an activity pattern type given the first set of attributes, wherein:

(i) a first classification of normalcy corresponds to expected activity associated with the transaction data of the first peer group and (ii) the first target entity is determined anomalous when an activity of the first target entity deviates beyond a threshold from the expected activity of other entities in the first peer group of entities;

determining, by the one or more computing devices, based on the first indicator, that the transaction data for the first target entity, having the set of attributes corresponding to the entity classification, and the second target entity is (i) potentially anomalous relative to the first classification of normalcy relative to the transaction data and with respect to the activity pattern type and (ii) not potentially anomalous relative to a second classification of normalcy represented by a second indicator indicating the second classification of normalcy relative to transaction data of a second peer group with respect to the activity pattern type given the second set of attributes, wherein a first classification of normalcy corresponds to expected activity associated with the transaction data of the first peer group;

in response to determining that the transaction data is potentially anomalous relative to the first classification of normalcy and is not potentially anomalous relative to the second classification of normalcy:

adjusting, by the one or more computing devices, the activity pattern type;

generating, by the one or more computing devices, a second set of evidence factors based on the adjusted activity pattern type;

re-training, by the one or more computing devices, the first transaction model using the second set of evidence factors to identify potentially anomalous activity associated with the adjusted activity pattern type;

generating, by the one or more computing devices and based on the re-training of the first transaction model, a model update specifying an adjustment for a second transaction model deployed at a second end-user device, wherein the second transaction model is initially trained to apply the first set of evidence factors, the model update specifying a change to the second transaction model derived from the re-training of the first transaction model; and providing, by the one or more computing devices, the model update for output to the second end-user device, wherein the model update, when received by the second end-user device, causes the second end-user device to adjust the second transaction model according to the change specified by the model update.

15. The system of claim 14, wherein the output data comprises:

a set of model parameters for identifying the potentially anomalous activity associated with the first target entity; and a respective model weight for each model parameter included in the set of model parameters.

16. The system of claim 15, wherein:

The first transaction model is trained to identify the potentially anomalous activity associated with the first target entity by applying the set of evidence factors to transaction data associated with the first target entity; and the output data excludes the transaction data associated the first target entity.

17. At least one non-transitory computer-readable storage device storing instructions that, when executed by one or more processors, causes the one or more processors to perform operations comprising:

obtaining output data generated by a first transaction model deployed at a first end-user device, wherein:

the first transaction model is trained to apply a set of evidence factors to predict a likelihood that first transaction data received by the first end-user device, or a first target entity transmitting the first transaction data from the first end-user device, is anomalous with respect to a plurality of peer groups, and each peer group included in the plurality of peer groups is associated with a set of attributes, wherein:

(i) the set of attributes include an entity classification, (ii) each peer group is associated with the entity classification, and (iii) each peer group is associated with a level of similarity shared between the set of attributes;

evaluating the output data in relation to the plurality of peer groups;

classifying, by the one or more processors and based on the set of attributes corresponding to the entity classification of the first target entity, the first target entity or a second target entity as belonging to at least (i) a first peer group of entities that share a first set of attributes and (ii) a second group of entities that share a second set of attributes;

processing, by the one or more processors and using the trained first transaction model, the transaction data for the first target entity or the second target entity in relation to the transaction data for entities included in the first peer group to determine a first indicator for the first target entity or the second target entity, wherein the first indicator represents a first classification of normalcy relative to transaction data of the first peer group with respect to an activity pattern type given the first set of attributes, wherein:

(i) a first classification of normalcy corresponds to expected activity associated with the transaction data of the first peer group and (ii) the first target entity is determined anomalous when an activity of the first target entity deviates beyond a threshold from the expected activity of other entities in the first peer group of entities;

determining, by the one or more processors, based on the first indicator, that the transaction data for the first target entity, having the set of attributes corresponding to the entity classification, and the second target entity is (i) potentially anomalous relative to the first classification of normalcy relative to the transaction data and with respect to the activity pattern type and (ii) not potentially anomalous relative to a second classification of normalcy represented by a second indicator indicating the second classification of normalcy relative to transaction data of a second peer group with respect to the activity pattern type given the second set of attributes, wherein a first classification of normalcy corresponds to expected activity associated with the transaction data of the first peer group;

in response to determining that the transaction data is potentially anomalous relative to the first classification of normalcy and is not potentially anomalous relative to the second classification of normalcy:
- adjusting, by the one or more processors, the activity pattern type;
- generating, by the one or more processors, a second set of evidence factors based on the adjusted activity pattern type;
- re-training, by the one or more processors, the first transaction model using the second set of evidence factors to identify potentially anomalous activity associated with the adjusted activity pattern type;
- generating, by the one or more processors and based on the re-training of the first transaction model, a model update specifying an adjustment for a second transaction model deployed at a second end-user device, wherein the second transaction model is initially trained to apply the first set of evidence factors, the model update specifying a change to the second transaction model derived from the re-training of the first transaction model; and
- providing, by the one or more processors, the model update for output to the second end-user device, wherein the model update, when received by the second end-user device, causes the second end-user device to adjust the second transaction model according to the change specified by the model update.

18. The non-transitory computer-readable storage device of claim 17, wherein the output data comprises:
- a set of model parameters associated with the first target entity; and
- a respective model weight for each model parameter included in the set of model parameters.

19. The non-transitory computer-readable storage device of claim 18, wherein:
- The first transaction model is trained to identify the potentially anomalous activity associated with the first target entity by applying the set of evidence factors to transaction data associated with the first target entity; and
- the output data excludes the transaction data associated the first target entity.

20. The non-transitory computer-readable storage device of claim 18, wherein:
- the second transaction model is trained to identify the potentially anomalous activity associated with the second target entity based on a second set of model parameters; and
- the adjustment for the second transaction model comprises adding a model parameter included in the set of model parameters associated with the first target entity and not included in the second set of model parameters associated with the second target entity.

* * * * *